(12) United States Patent
Kaneria

(10) Patent No.: US 12,165,097 B2
(45) Date of Patent: *Dec. 10, 2024

(54) SYSTEM AND METHOD FOR SECURE DELIVERY OF A MEDICATION PACKAGE USING UNMANNED AERIAL VEHICLES

(71) Applicant: Evernorth Strategic Development, Inc., St. Louis, MO (US)

(72) Inventor: Ankur Kaneria, Cedar Park, TX (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,450

(22) Filed: Dec. 5, 2023

(65) Prior Publication Data

US 2024/0119401 A1 Apr. 11, 2024

Related U.S. Application Data

(63) Continuation of application No. 17/529,743, filed on Nov. 18, 2021, now Pat. No. 11,847,604.

(51) Int. Cl.
*G06Q 10/0832* (2023.01)
*B64C 39/02* (2023.01)
(Continued)

(52) U.S. Cl.
CPC ....... *G06Q 10/0832* (2013.01); *B64C 39/024* (2013.01); *B64U 10/13* (2023.01);
(Continued)

(58) Field of Classification Search
CPC ............ G06Q 10/0832; G06Q 10/0833; G06F 21/32; B64U 2101/55
(Continued)

(56) References Cited

U.S. PATENT DOCUMENTS 8,600,903 B2   12/2013 Eller
9,244,147 B1   1/2016 Soundararajan
(Continued)

FOREIGN PATENT DOCUMENTS

AU   2018390417 B2 *  4/2021  .......... B64C 39/024
JP   2023005736 A  *  1/2023

OTHER PUBLICATIONS

Secure delivery to recipient mobile phone location for a Semi-Autonomous Vehicle Delivery System. Feb. 17, 2015. The IP.com Journal. pp. 1-2. https://priorart.ip.com/IPCOM/000240666. (Year: 2015).*

*Primary Examiner* — Jeff Zimmerman
*Assistant Examiner* — Hunter A Molnar

(57) ABSTRACT

A method includes, in response to a determination that one or more authenticated delivery locations includes a first delivery location, identifying, using an unmanned aerial vehicle registry, one or more unmanned aerial vehicles based on at least one unmanned aerial vehicle characteristic associated with a medication delivery request. The method also includes determining, for each unmanned aerial vehicle of the one or more unmanned aerial vehicles, an availability status, selecting an unmanned aerial vehicle based on at least a corresponding availability status and at least one selection criteria, and instructing the unmanned aerial vehicle to transport the medication package from a starting location to the first delivery location.

20 Claims, 12 Drawing Sheets

(51) Int. Cl.
  *B64U 10/13* (2023.01)
  *B64U 101/55* (2023.01)
  *G01C 21/20* (2006.01)
  *G06F 21/32* (2013.01)
  *B64U 101/60* (2023.01)

(52) U.S. Cl.
  CPC .............. *G01C 21/20* (2013.01); *G06F 21/32* (2013.01); *B64U 2101/55* (2023.01); *B64U 2101/60* (2023.01)

(58) Field of Classification Search
  USPC ......................................................... 705/332
  See application file for complete search history.

(56) References Cited

U.S. PATENT DOCUMENTS

| | | | |
|---|---|---|---|
| 9,536,216 B1 | 1/2017 | Lisso | |
| 9,561,871 B2 | 2/2017 | Sugumaran | |
| 9,573,684 B2 | 2/2017 | Kimchi | |
| 9,646,283 B2 | 5/2017 | Kantor | |
| 9,747,901 B1 | 8/2017 | Gentry | |
| 9,801,517 B2 | 10/2017 | High | |
| 10,040,552 B2 | 8/2018 | Gordon | |
| 10,139,817 B2 | 11/2018 | High | |
| 10,198,708 B2 | 2/2019 | Mattingly | |
| 10,292,055 B2 | 5/2019 | Carpenter | |
| 10,293,938 B2 | 5/2019 | Thompson | |
| 10,351,239 B2 | 7/2019 | Di Benedetto | |
| 10,484,884 B2 | 11/2019 | Carpenter | |
| 10,486,883 B2 | 11/2019 | Winkle | |
| 10,518,882 B2 | 12/2019 | Gordon | |
| 10,538,327 B2 | 1/2020 | High | |
| 10,562,398 B2 | 2/2020 | High | |
| 10,600,020 B2 | 3/2020 | Stenneth | |
| 10,614,503 B2 | 4/2020 | High | |
| 10,687,220 B2 | 6/2020 | Carpenter | |
| 10,783,478 B2 | 9/2020 | Studnicka | |
| 10,807,714 B2 | 10/2020 | Atchley | |
| 10,822,083 B2 | 11/2020 | Gordon | |
| 10,874,240 B2 | 12/2020 | Lewis | |
| 10,909,492 B1 | 2/2021 | Reinhardt | |
| 11,053,021 B2 | 7/2021 | Di Benedetto | |
| 11,066,186 B2 | 7/2021 | Walsh | |
| 2004/0135031 A1 | 7/2004 | Stupakis | |
| 2010/0004802 A1 | 1/2010 | Bodin | |
| 2014/0032034 A1 | 1/2014 | Raptopoulos | |
| 2016/0033966 A1 | 2/2016 | Farris | |
| 2016/0068264 A1 | 3/2016 | Ganesh | |
| 2016/0307449 A1 | 10/2016 | Gordon | |
| 2017/0255896 A1 | 9/2017 | Van Dyke | |
| 2017/0267343 A1 | 9/2017 | Chen | |
| 2019/0012631 A1* | 1/2019 | Chatani | G06Q 10/083 |
| 2019/0054630 A1 | 2/2019 | Lewis | |
| 2019/0061939 A1* | 2/2019 | Anand | H04W 12/06 |
| 2019/0079509 A1 | 3/2019 | Bosworth | |
| 2019/0130770 A1* | 5/2019 | Di Benedetto | G08G 5/006 |
| 2019/0300202 A1 | 10/2019 | High | |
| 2020/0130829 A1* | 4/2020 | Gandiga | G05D 1/0061 |
| 2021/0073715 A1* | 3/2021 | Yamada | B64D 27/24 |

\* cited by examiner

SYSTEM AND METHOD FOR SECURE DELIVERY OF A MEDICATION PACKAGE USING UNMANNED AERIAL VEHICLES

CROSS REFERENCE TO RELATED APPLICATIONS

This application is a continuation of U.S. application Ser. No. 17/529,743, which was filed Nov. 18, 2021. The entire disclosure of said application is incorporated herein by reference.

TECHNICAL FIELD

This disclosure relates to medication delivery and, in particular, to systems and methods for secure delivery of a medication package using unmanned aerial vehicles.

BACKGROUND

Medications, such as prescription medications, over-the-counter medications, vitamins, supplements, and the like, are increasingly being delivered by a medication provider to a residence or other location of an individual requiring such medications. Medications may be delivered using a variety of delivery services, such as a postal service, a parcel delivery service, a contractor, or other service under direct control of a corresponding medication provider, and the like.

Secure delivery of such medications, due to governmental regulations, expectations of privacy of recipients receiving the medications, and a variety of other factors, is of paramount importance. Accordingly, pharmacies responsible for the delivery of such medications may require a respective delivery service to obtain a signature or other form of authorization before releasing control of the medication to the recipient.

SUMMARY

This disclosure relates generally to medication delivery.

An aspect of the disclosed embodiments includes a method for controlling secure delivery of a medication package. The method includes receiving a medication delivery request to deliver a medication package to a first delivery location, identifying a recipient associated with the medication delivery request, and identifying one or more authenticated delivery locations corresponding to the recipient. The method also includes determining whether the one or more authenticated delivery locations includes the first delivery location and, in response to a determination that the one or more authenticated delivery locations includes the first delivery location, identifying, using an unmanned aerial vehicle registry, one or more unmanned aerial vehicles based on at least one unmanned aerial vehicle characteristic associated with the medication delivery request. The method also includes determining, for each unmanned aerial vehicle of the one or more unmanned aerial vehicles, an availability status, selecting an unmanned aerial vehicle of the one or more unmanned aerial vehicles based on at least a corresponding availability status and at least one selection criteria, and instructing the unmanned aerial vehicle to transport the medication package from a starting location to the first delivery location. The method also includes, in response to the unmanned aerial vehicle communicating authentication data, determining whether the authentication data corresponds to the recipient and, in response to a determination that the authentication data corresponds to the recipient, instructing the unmanned aerial vehicle to release the medication package to the recipient.

Another aspect of the disclosed embodiments includes a system for controlling secure delivery of a medication package. The system includes a processor and a memory. The memory includes instructions that, when executed by the processor, cause the processor to: receive a medication delivery request to deliver a medication package to a first delivery location; identify a recipient associated with the medication delivery request; identify one or more authenticated delivery locations corresponding to the recipient; determine whether the one or more authenticated delivery locations includes the first delivery location; in response to a determination that the one or more authenticated delivery locations includes the first delivery location, identify, using an unmanned aerial vehicle registry, one or more unmanned aerial vehicles based on at least one unmanned aerial vehicle characteristic associated with the medication delivery request; determine, for each unmanned aerial vehicle of the one or more unmanned aerial vehicles, an availability status; select an unmanned aerial vehicle of the one or more unmanned aerial vehicles based on at least a corresponding availability status and at least one selection criteria; instruct the unmanned aerial vehicle to transport the medication package from a starting location to the first delivery location; and, in response to the unmanned aerial vehicle communicating authentication data: determine whether the authentication data corresponds to the recipient; and, in response to a determination that the authentication data corresponds to the recipient, instruct the unmanned aerial vehicle to release the medication package to the recipient.

Another aspect of the disclosed embodiments includes an apparatus for controlling secure delivery of a medication package includes a processor and a memory. The memory includes instructions that, when executed by the processor, cause the processor to: receive a medication delivery request to deliver a medication package to a first delivery location; identify, using an unmanned aerial vehicle registry, one or more unmanned aerial vehicles based on at least one unmanned aerial vehicle characteristic associated with the medication delivery request; determine, for each unmanned aerial vehicle of the one or more unmanned aerial vehicles, an availability status; select an unmanned aerial vehicle of the one or more unmanned aerial vehicles based on at least a corresponding availability status; instruct the unmanned aerial vehicle to transport the medication package from a starting location to the first delivery location; and, in response to the unmanned aerial vehicle communicating authentication data: determine whether the authentication data corresponds to a recipient associated with the medication delivery request; and, in response to a determination that the authentication data corresponds to the recipient, instruct the unmanned aerial vehicle to release the medication package to the recipient.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
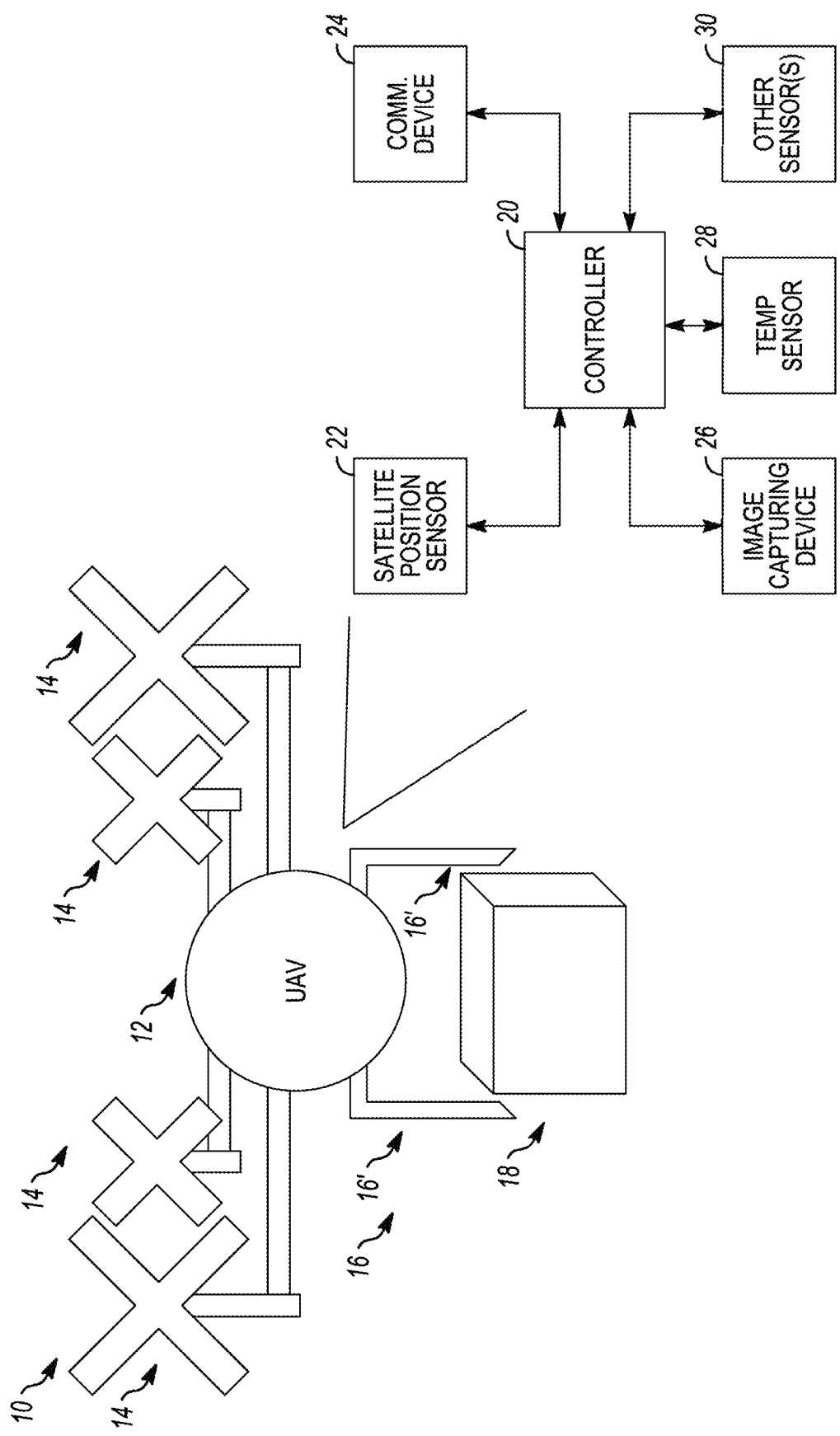
FIG. 1 generally illustrates an unmanned aerial vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, medications, such as prescription medications, over-the-counter medications, vitamins, supplements, and the like, are increasingly being delivered by a medication provider to a residence or other location of an individual requiring such medications. Medications may be delivered using a variety of delivery services, such as a postal service, a parcel delivery service, a contractor, or other service under direct control of a corresponding medication provider, and the like. Such delivery services may be ground-based vehicles or aircraft.

Secure delivery of such medications, due to governmental regulations, expectations of privacy of recipients receiving the medications, and a variety of other factors, is of paramount importance. Accordingly, pharmacies responsible for the delivery of such medications may require a respective delivery service to obtain a signature of other form of authorization before releasing control of the medication to the recipient.

As the demand for medication delivery services increases, the potential for a security or privacy breach of a medication recipient becomes more likely. Further, traditional delivery services may be incapable of managing the increased medication delivery load in a secure and timely manner. Accordingly, systems and methods, such as those described herein, that are configured to provide secure delivery of medication packages using unmanned aerial vehicles (UAV), may be desirable.

The secure delivery may include the use of facial recognition authentication by the UAV of an individual at the delivery location receiving the medication package from the UAV. The secure delivery may include authentication of the delivery location (e.g., by comparing stored image files to images captured by an image-capturing device of the UAV at the delivery location)

In some embodiments, the systems and methods described herein may be configured to deliver medication packages using UAVs communicatively connected via a mesh network to one or more delivery locations designated by the recipient. The systems and methods described herein may be configured to receive location information from the recipient for one or more delivery locations (e.g., a home, a workplace, a caregiver facility, and the like). The systems and methods described herein may be configured to store coordinates and/or other identifying information for each of the one or more delivery locations. In some embodiments, the systems and methods described herein may be configured to re-route a UAV from a first delivery location to a second delivery location in response to a re-route request from the recipient. The re-route request may be a command issued by an authenticated user device to the pharmacy system. The pharmacy system may validate the command and the new delivery location. Upon validation, the pharmacy system may instruct the UAV to delivery to the new, re-route location. The pharmacy system may also send new authentication files to the UAV. The new authentication files may include images of the new location and new secure, wait locations adjacent the new delivery location, other suitable information, or a combination thereof.

In some embodiments, the systems and methods described herein may be configured to ensure secure delivery of the medication package using one or more of biometric data (e.g., facial recognition, finger print authentication, retina scan data, audio analysis and comparison, speech analysis and comparison, and the like), quick read (QR) code data, barcode data, signature data, photo identification scan data, numeric pin entry data (e.g., a numeric value communicated by a computing device of the pharmacy responsible for the medication package to a mobile computing device associated with the recipient), other suitable data, or a combination thereof received from the recipient.

In some embodiments, the systems and methods described herein may be configured to allow the recipient to designate an individual or individuals authorized to accept the medication package for the recipient (e.g., a care of individual). The systems and methods described herein may be configured to ensure secure delivery of the medication package to an individual authorized to accept the medication package for the recipient using one or more of biometric data (e.g., facial recognition, finger print authentication, retina scan data, audio analysis and comparison, speech analysis and comparison, and the like), quick read (QR) code data, barcode data, signature data, photo identification scan data, numeric pin entry data (e.g., a numeric value communicated by a computing device of the pharmacy responsible for the medication package to a mobile computing device associated with the recipient), other suitable data, or a combination thereof received from the individual authorized to accept the medication package for the recipient.

In some embodiments, the systems and methods described herein may be configured to receive a medication delivery request to deliver a medication package to a first delivery location. The systems and methods described herein may be configured to identify a recipient associated with the medication delivery request. The systems and methods described herein may be configured to identify one or more authenticated delivery locations corresponding to the recipient.

In some embodiments, the systems and methods described herein may be configured to determine whether the one or more authenticated delivery locations includes the first delivery location. The systems and methods described herein may be configured to, in response to a determination that the one or more authenticated delivery locations includes the first delivery location, instruct a UAV to transport the medication package from a starting location to the first delivery location. The systems and methods described herein may be configured to, in response to the unmanned aerial vehicle communicating authentication data, determine whether the authentication data corresponds to the recipient. The authentication data may include biometric data, audio data, QR code data, barcode data, signature data, photo identification scan data, numeric pin entry data, other suitable data, or a combination thereof. In some embodiments, the authentication data may include a file containing facial recognition data of a person authorized to receive the medication package. In some embodiments, the authentication data may include an audio data file containing audio data of a person authorized to receive the medication package. In embodiments, the authentication data may include a location file that represents the actual authorized delivery location. The systems and methods described herein may be configured to, in response to a determination that the authentication data corresponds to the recipient, instruct the UAV to release the medication package to the recipient.

In some embodiments, the systems and methods described herein may be configured to, in response to a determination that the UAV did not communicate authentication data, determine whether the first delivery location includes an authorized deposit location. The systems and methods described herein may be configured to, in response to a determination that the first delivery location includes an authorized deposit location, instruct the UAV to deposit the medication package at the authorized deposit location.

In some embodiments, the systems and methods described herein may be configured to, in response to a determination that the first delivery location does not include an authorized deposit location, instruct the UAV to identify a secure location at the first delivery location. The systems and methods described herein may be configured to instruct the UAV to wait a first predetermined period at the secure location.

In some embodiments, the systems and methods described herein may be configured to receive a time extension request from the recipient. The systems and methods described herein may be configured to instruct the UAV to wait a second predetermined period at the secure location. In some embodiments, the systems and methods described herein may be configured to, in response to a determination that the first delivery location does not include an authorized deposit location, instruct the UAV to return the medication package to the starting location.

In some embodiments, the systems and methods described herein may be configured to, in response to a receiving a reroute request from the recipient indicating a second delivery location, determine whether the one or more authenticated delivery locations includes the second delivery location. The systems and methods described herein may be configured to, in response to a determination that the one or more authenticated delivery locations includes the second delivery location, instruct the UAV to transport the medication package to the second delivery location or to transport the medication package to the starting location.

In some embodiments, the systems and methods described herein may be configured to, in response to a receiving a reroute request from the recipient indicating a dynamic delivery location, identify location information corresponding to a mobile computing device associated with the recipient. The systems and methods described herein may be configured to instruct the UAV to transport the medication package to an identified location of the recipient. The identified location may be identified based on the location information. In some embodiments, dynamic delivery may require the recipient authentication (e.g., facial recognition or a code displayed on the recipient's device). The recipient authentication can include audio data of a person authorized to receive the medication package.

In some embodiments, the systems and methods described herein may be configured to, in response to a determination that the UAV communicated authentication data corresponding to the recipient, instruct the UAV to release the medication package to the recipient at the identified location of the recipient. The systems and methods described herein may be configured to, in response to a determination that the UAV did not communicate authentication data corresponding to the recipient, instruct the UAV to transport the medication package to a secure location or to the starting location.

In some embodiments, the systems and methods described herein may be configured to receive a medication delivery request to deliver a medication package to a first delivery location. The systems and methods described herein may be configured to identify a recipient associated with the medication delivery request. The systems and methods described herein may be configured to identify one or more authenticated delivery locations corresponding to the recipient. The systems and methods described herein may be configured to determine whether the one or more authenticated delivery locations includes the first delivery location. The systems and methods described herein may be configured to, in response to a determination that the one or more authenticated delivery locations includes the first delivery location, identify, using an unmanned aerial vehicle registry, one or more unmanned aerial vehicles based on at least one unmanned aerial vehicle characteristic associated with the medication delivery request. The at least one unmanned aerial vehicle characteristic may include at least one of an unmanned aerial vehicle range, an unmanned aerial vehicle speed, an unmanned aerial vehicle payload capacity, an unmanned aerial vehicle security feature, an unmanned aerial vehicle temperature control feature, an unmanned aerial vehicle humidity control feature, any other suitable characteristic, or a combination thereof.

The systems and methods described herein may be configured to determine, for each unmanned aerial vehicle of the one or more unmanned aerial vehicles, an availability status. The systems and methods described herein may be configured to select an unmanned aerial vehicle of the one or more unmanned aerial vehicles based on at least a corresponding availability status and at least one selection criteria. The selection criteria may include any suitable criteria, including, but not limited to, a total distance threshold (e.g., corresponding to a total distance to be traveled by the unmanned aerial vehicle), a state of charge of a battery threshold (e.g., corresponding to a state of charge of the battery of the unmanned aerial vehicle), a payload capacity (e.g., corresponding to a minimum or maximum payload capacity of the unmanned aerial vehicle), other suitable criteria, or a combination thereof. The systems and methods described herein may be configured to instruct the unmanned aerial vehicle to transport the medication package from a starting location to the first delivery location.

The systems and methods described herein may be configured to, in response to the unmanned aerial vehicle communicating authentication data, determine whether the authentication data corresponds to the recipient. The systems and methods described herein may be configured to, in response to a determination that the authentication data corresponds to the recipient, instruct the unmanned aerial vehicle to release the medication package to the recipient.

In some embodiments, the systems and methods described herein may be configured to, in response to a determination that the unmanned aerial vehicle did not communicate authentication data, determine whether the first delivery location includes an authorized deposit location. The systems and methods described herein may be configured to, in response to a determination that the first delivery location includes an authorized deposit location, instruct the unmanned aerial vehicle to deposit the medication package at the authorized deposit location.

In some embodiments, the systems and methods described herein may be configured to, in response to a determination that the first delivery location does not include an authorized deposit location, instruct the unmanned aerial vehicle to identify a secure location at the first delivery location. The systems and methods described herein may be configured to instruct the unmanned aerial vehicle to wait a first predetermined period at the secure location.

In some embodiments, the systems and methods described herein may be configured to receive a time extension request from the recipient. The systems and methods described herein may be configured to instruct the unmanned aerial vehicle to wait a second predetermined period at the secure location.

In some embodiments, systems and methods described herein may be configured to, in response to a receiving a reroute request from the recipient indicating a second delivery location, determine whether the one or more authenticated delivery locations includes the second delivery location. The systems and methods described herein may be configured to, in response to a determination that the one or more authenticated delivery locations includes the second delivery location, instruct the unmanned aerial vehicle to one of transport the medication package to the second delivery location and transfer the medication package to another unmanned aerial vehicle based on at least a state of charge of a battery of the unmanned aerial vehicle.

In some embodiments, the systems and methods described herein may be configured to, in response to a receiving a reroute request from the recipient indicating a dynamic delivery location, identify location information corresponding to a mobile computing device associated with the recipient. The systems and methods described herein may be configured to instruct the unmanned aerial vehicle to transport the medication package to an identified location of the recipient. The identified location may be identified based on the location information.

FIG. 1 generally illustrates an unmanned aerial vehicle (UAV) 10 according to the principles of the present disclosure. The UAV 10 may include an aerial vehicle that is unpiloted or unmanned and may be referred to as a drone (e.g., when piloted remotely). The UAV 10 may include a body 12. The body 12 may include any suitable body and comprise any suitable shape and/or size.

In some embodiments, the UAV 10 may include one or more rotors 14. The rotors 14 may be configured to rotate at a rate that causes the UAV 10 to lift. The rotors 14 may be selectively rotatable along a horizontal axis causing the UAV 10, in response to various rotations of selective ones of the rotors 14 about the horizontal axis, to cause the UAV 10 to travel in a forward direction, travel in a backward direction, travel in one of various sideways directions, or travel in any suitable direction. In some embodiments, the one or more of the rotors 14 may rotate along a vertical axis. It should be understood that, while the UAV 10 is illustrated to include four rotors 14, the UAV 10 may include one rotor 14, two rotors 14, three rotors 14, four rotors 14, or any suitable number of rotors 14, and/or other suitable rotors other than the rotors 14. Additionally, or alternatively, the rotors 14 may include any size or number of rotor blades. The rotors 14 may be designed to provide lift for the UAV 10 and/or any package that the UAV 10 may carry to a destination location. In some embodiments, the UAV 10 may include one or more wings to provide lift and/or assist the rotors 14 lift the UAV 10.

In some embodiments, the UAV 10 may include a carrier 16 disposed on the body 12. The carrier 16 may be configured to carrier or hold a package, such as a medication package 18. The carrier 16 may include one or more carrier arms 16'. The carrier arms 16' may include actuatable (e.g., capable of being actuated) or articulate arms in communication with one or more actuating components that cause the carrier arms 16' to extend in any suitable direction and to retract toward the medication package 18, such that the carrier arms 16' securely grip and/or hold the medication package 18. The articulating components may include a stepper motor and a linkage (e.g. or other suitable components) configured to cause the carrier arms 16' to move from an open position to a closed position, to release a package or grip a package respectively.

It should be understood that the carrier 16 and/or carrier arms 16' may include any suitable carrier and/or carrier arms and may be configured to securely grip or hold the medication package 18 in any suitable manner other than those described herein. Additionally, or alternatively, the UAV 10 may include the carrier 16 and/or a basket, a net, a closable compartment (e.g., including a lockable compartment), or any suitable mechanism for securely gripping, holding, and/or carrying the medication package 18.

In some embodiments, the body 12 may be configured to house or enclose a controller 20 configured to control operations of the UAV 10. The controller 20 may include a processor and a memory. The processor may include any suitable processor, such as those described herein. The memory may include Random Access Memory (RAM), a Read-Only Memory (ROM), or a combination thereof. The memory may store programs, utilities, or processes to be executed in by the processor. The memory may provide volatile data storage, and stores instructions related to the operation of the 100 UAV 10. For example, the memory may store UAV specific instructions for execution by the processor and data related to the medication package 18, the other UAVs 10', the environmental characteristics (e.g., or the route, the destination location, and/or other environmental characteristics), other suitable data, or a combination thereof.

Figure 3A:
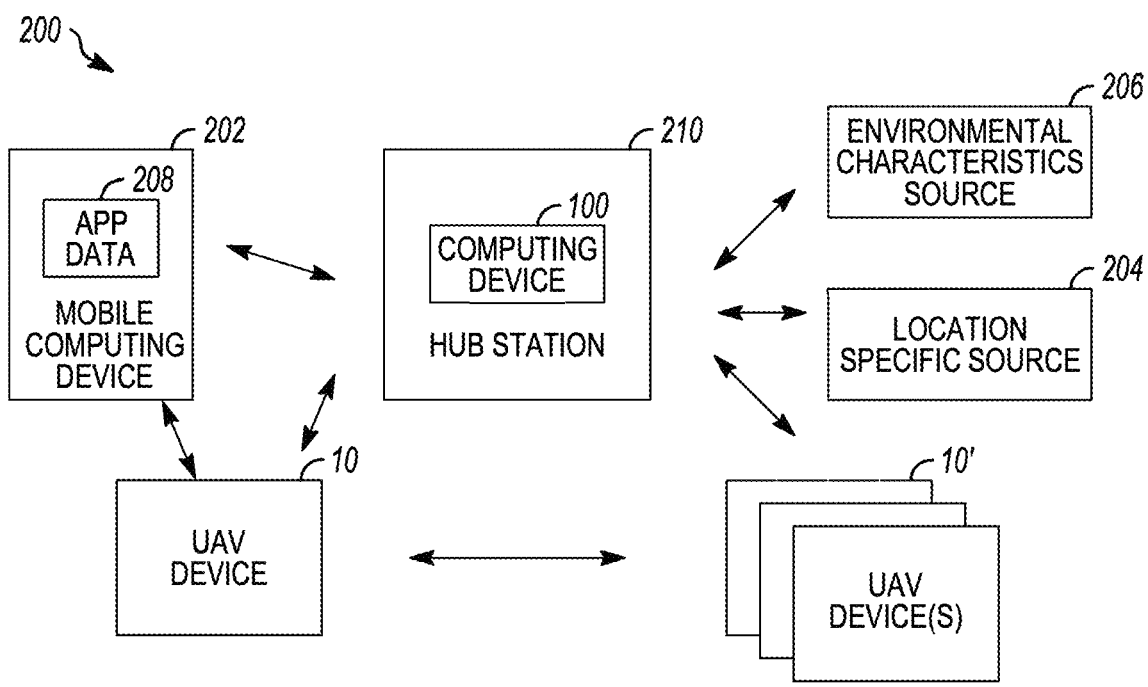
FIG. 3A generally illustrates a block diagram of a medication package delivery system according to the principles of the present disclosure.
Figure 3B:
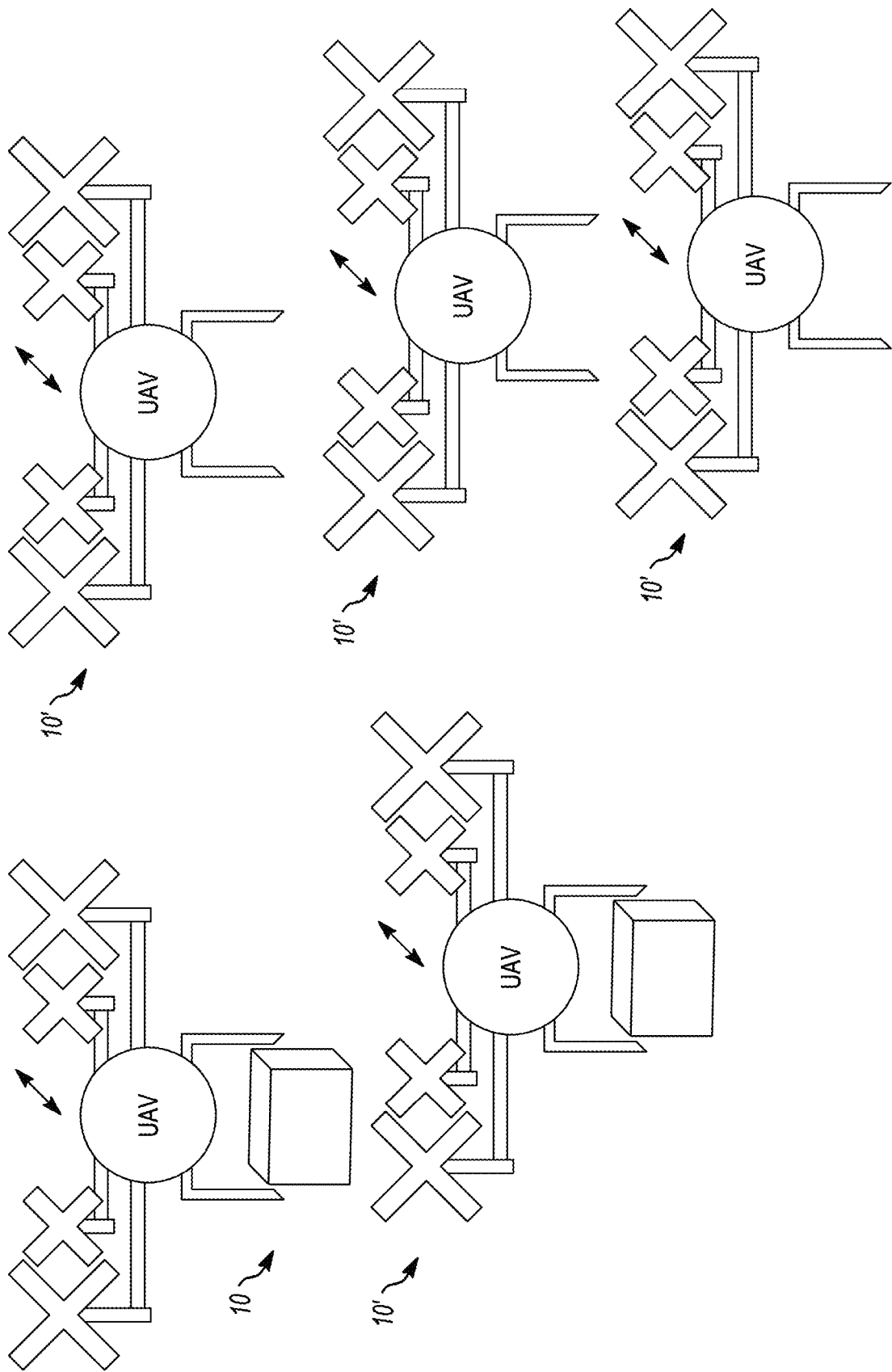
FIG. 3B generally illustrates an unmanned aerial vehicle communications network according to the principles of the present disclosure.

The UAV 10 may include various sensors or data capturing devices. For example, the UAV 10 may include a satellite positioning (e.g., a global positioning system (GPS) sensor) 22 configured to provide global positioning data. The satellite navigation receive may also operate to determine a UAV location using a global navigation satellite system (GLONASS), BeiDue navigation system, Galileo navigation system, and the like. The controller 20 may use the global position data received from the GPS satellite positioning sensor 22 to operate the UAV 10 along a delivery path for the medication package, or any suitable path. The path may be calculated based on information indicating characteristics of the physical terrain and various manmade structures. The UAV 10 may include a communication device 24 configured to communicate with, as is generally illustrated in FIGS. 3A and 3B, other UAVs, such as the other UAVs 10', one or more mobile computing devices, such as the mobile computing device 202, data sources, such as a location specific data source 204 and an environmental characteristics data source 206, a hub station, such as the hub station 210, other suitable devices or mechanism, or a combination thereof.

The communication device 24 may include any suitable communication device, such as a WiFi transmitter and/or receiver, a Bluetooth device, a long-range communication device, a short-range communication device, a radio device, a 4G device, a 5G device, a mesh transceiver, any other suitable communication device, or a combination thereof. The communication device 24 may provide communication device 24 provides communication between the UAV 10 and a hub, a base station, or other UAVs.

The UAV 10 may include an image-capturing device 26 and/or other suitable data capturing devices. The image-capturing device 26 may include a solid-state image device (e.g. a charger-coupled device (CCD), or other suitable solid-state image capturing device), or other suitable image-capturing device. The image-capturing device 26 may include or be one of a plurality of image-capturing devices. The image-capturing device 26 may be configured to capture image data corresponding to an environment external to the UAV 10 (e.g., within a visible range of the image-capturing device 26). The controller 20 may be configured to analyze the image data and selectively control the UAV 10 based on the image data. In some embodiments, the controller 20 may communicate the image data to the hub station 210. The hub station 210 may analyze the image data and communicate instructions for controlling the UAV 10 to the controller 20. The controller 20 may control the UAV 10 based on the instructions.

The UAV 10 may include a temperature sensor 28. The temperature sensor 28 may be configured to sense or measure one or more temperature measurements of the environment external to the UAV 10. The controller 20 may selectively control operations of the UAV 10 based on the one or more temperature measurements. In some embodiments, the controller 20 may communicate the one or more temperature measurements to the hub station 210. The hub station 210 may analyze the one or more temperature measurements and may provide instructions to the controller 20 for controlling the UAV 10 based on the one or more temperature measurements. The controller 20 may selectively control operations of the UAV 10 and/or other UAVs 10' based on the instructions. The UAV 10 may include other sensors 30. The other sensors 30 may include any suitable sensors include gyroscope sensors, vibration sensors, motion sensors, moisture sensors, light sensors, infrared sensors, radar sensors, LIDAR sensors, sonar sensors, any other suitable sensors, or a combination thereof. In some embodiments, the UAV 10 may be configured to determine whether the UAV 10 and/or the medication package 18 is being tampered with. For example, the controller 20 may monitor measurements from the gyroscope sensors, the vibration sensor, the motion sensors, other suitable sensors, or a combination thereof. The controller 20 may determine whether the measurements are above a threshold (e.g., either individually or in any suitable combination of measurement). If the controller 20 determines the measurements are above the threshold, the controller 20 determines that the UAV 10 and/or the medication package is being tampered with.

The controller 20 communicates an emergency notification to other UAVs 10' via the mesh network. Selective ones of other UAVs 10', such as other UAVs 10' with in a predetermined distance of the UAV 10, may travel to a location of the UAV 10 in order to capture image data of the UAV 10 and/or the medication package 18 being tampered with. The other UAVs 10' may communicate, via the mesh network, the image data to the hub station 210. The hub station 210 may use the image data as evidence of tampering. Additionally, or alternatively, the UAV 10, one or more of the UAVs 10', and/or the hub station may contact local authorities to assist the UAV 10. In some embodiments, the controller 20 may communicate directly with the hub station 210 using other suitable communications mechanism, described herein (e.g., in response to a fault in the mesh network). The controller 20 may communicate the emergency notification to the hub station 210. The hub station 210 may identity other UAVs 10' within a predetermined range of the UAV 10. The hub station 210 may instruct the UAVs 10' to travel to the location of the UAV 10 in order to capture the image data.

The UAV 10 may not have power to continue to fly and may not be able to signal the hub station. The other UAVs 10' can receive the signal from the UAV 10 and retransmit the signal to the hub station or other UAVs, which in turn transmit the message to the hub station 210. Thus the other UAVs act as a proxies to relay that message back to base station/hub 210. The UAVs, as a whole, can act as a mesh communication network passing electronic messages from other UAVs. The messages include the source UAV identifier. In an example embodiment, each UAV that receives and retransmits that message appends its unique identifier to the message. The UAVs can each operate to encrypt the message using its own private key. The message may be encrypted multiple times, e.g., once by each UAV. The hub station 210 will decrypt the message in the reverse order, LIFO, of the communication travel of the message.

In some embodiments, the UAV 10 may include a fingerprint scanning device configure to scan fingerprints of, for example, the recipient of the medication package 18. The UAV 10 may include an input device configured to receive a signature, for example, of the recipient of the medication package 18. In some embodiments, the UAV 10 may include a retina scanner and/or the image-capturing device 26 may be configured to scan the retina of individuals. The input device may be configured to receive a numeric input, for example, such as a numeric pin from the recipient of the medication package 18. The UAV 10 may include any other suitable input device, output device, sensor, or other suitable mechanism for receiving input, providing output, sensing or measuring various characteristics of the UAV 10, the environment of the UAV 10, the recipient, or any combination thereof.

Figure 2:
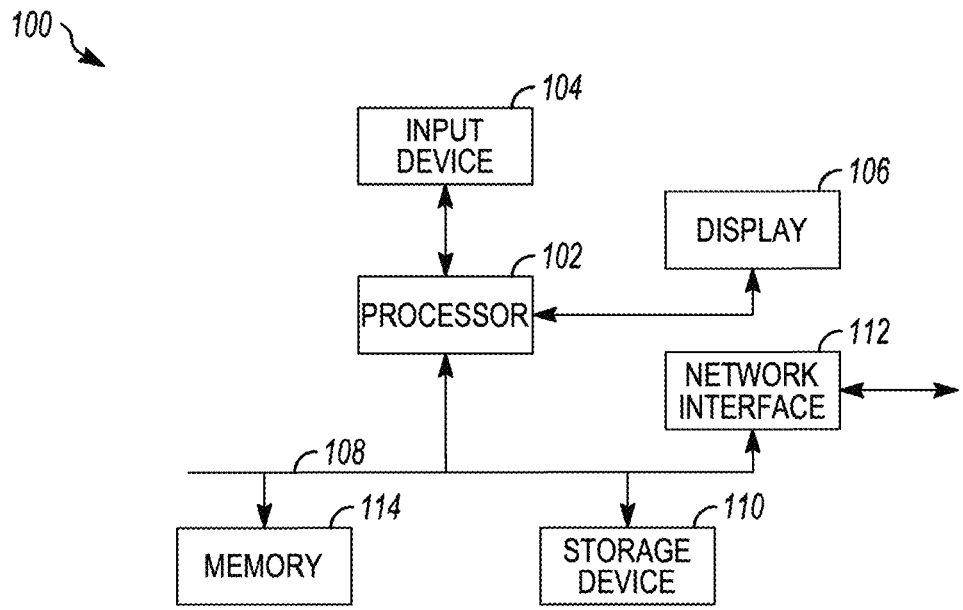
FIG. 2 generally illustrates a computing device according to the principles of the present disclosure.

FIG. 2 generally illustrates a computing device 100 according to the principle of the present disclosure. The computing device 100 may be configured to control operation of the UAV 10 and/or other UAVs 10'. As is generally illustrated, the hub station 210 may include the computing device 100 or any other suitable computing device. The computing device 100 may include any suitable computing device.

The computing device 100 may include a processor 102 configured to control the overall operation of computing device 100. The processor 102 may include any suitable processor, such as those described herein. The computing device 100 may also include a user input device 104 that is configured to receive input from a user of the computing device 100 and to communicate signals representing the input received from the user to the processor 102. For example, the user input device 104 may include a button, keypad, dial, touch screen, audio input interface, visual/image capture input interface, input in the form of sensor data, etc.

The computing device 100 may include a display 106 that may be controlled by the processor 102 to display information to the user. A data bus 108 may be configured to facilitate data transfer between, at least, a storage device 110 and the processor 102. The computing device 100 may also include a network interface 112 configured to couple or connect the computing device 100 to various other computing devices or network devices via a network connection, such as a wired or wireless connection. In some embodiments, the network interface 112 includes a wireless transceiver.

The storage device 110 may comprise a single disk or a plurality of disks (e.g., hard drives), one or more solid-state drives, one or more hybrid hard drives, and the like. The storage device 110 may include a storage management module that manages one or more partitions within the storage device 110. In some embodiments, storage device 110 may include flash memory, semiconductor (solid state) memory or the like. The computing device 100 may also include a memory 114. The memory 114 may include Random Access Memory (RAM), a Read-Only Memory (ROM), or a combination thereof. The memory 114 may store programs, utilities, or processes to be executed in by the processor 102. The memory 114 may provide volatile data storage, and stores instructions related to the operation of the computing device 100.

In some embodiments, the processor 102 may be configured to execute instructions stored on the memory 114 to, at least, control operations of the UAV 10, the other UAVs 10', delivery of the medication package 18, any other suitable operations, or a combination thereof. The processor 102 may be configured to display, on the display 106, various UAV control information, various data corresponding to the medication package 18, other suitable information, or a combination thereof. In some embodiments, the computing device 100 may omit the display 106.

FIG. 3A generally illustrates a block diagram of a medication package delivery system 200, including the UAV 10, the other UAVs 10', and the hub station 210. The UAV 10 may be controlled by a human pilot or robotic via a ground controller and may be referred to as a drone when being controlled by a pilot via a ground controller. In some embodiments, the UAV 10 may be semi-autonomous or fully autonomous. In some embodiments, the computing device 100 of the hub station 210 may provide instructions to the UAV 10 to deliver the medication package 18, retrieve the medication package 18, other suitable instructions, or a combination thereof. The UAV 10 may autonomously carry out the instructions. For example, the computing device 100 may instruct the UAV 10 to transport the medication package 18 to a delivery location and the UAV 10 may autonomously determine a flight path to the delivery location and/or autonomously determine or execute various other operations. In some embodiments, the hub station 210 may be housed or located at a pharmacy, at a distribution center, at a delivery center, on a vehicle (e.g., a mobile distribution center), and the like.

In some embodiments, the hub station 210 may identify the UAV 10 and/or one of the other UAVs 10' for delivery of the medication package 18 based on one or more characteristics of the UAV 10 and/or the UAVs 10'. The one or more characteristics may include a flight distance capability (e.g., based on battery charge or other suitable flight distance capabilities), a carrying capacity, a current location of the UAV 10 and/or the UAV 10's to the location of the medication package 18, other suitable characteristics, or a combination thereof. For example, the hub station 210 may determine a total travel distance for the UAV 10 to retrieve the medication package 18 starting from a current location of the UAV 10 and to deposit the mediation package 18 are the destination location. The hub station 210 may determine whether the battery of the UAV 10 includes enough charge to traverse the total travel distance while carrying the medication package 18 (e.g., taking into account the UAV 10 carrying the medication package 18 and any potential drain on the battery do to the weight, size, shape, and/or other characteristics of the medication package 18).

In some embodiments, the medication package 18 may be packed at a pharmacy, distribution center, or other suitable location. As described, the medication package 18 may include a temperature-controlled package including insulation, ice, gel packs, dry ice, any other suitable thermal control mechanism, or a combination thereof. For example, a technician packing medication (e.g., which may include one or more related or unrelated medications) in the medication package 18 may utilize a thermal packaging determination system configured to determine thermal control requirements of the medication in the medication package 18. The thermal packaging determination system may indicate to the technician suitable amounts of thermal packaging for the medication package 18. The technician may selectively include insulation, ice, gel packs, dry ice, other suitable thermal control mechanisms, or a combination thereof based on the indication from the thermal packaging determination system to control temperature of the medication in the medication package 18 for a period. In some embodiments, an automated system may be configured to autonomously include insulation, ice, gel packs, dry ice, other suitable thermal control mechanisms, or a combination thereof based on the indication from the thermal packaging determination system.

The period, which may be referred to as a thermal control period or a thermal budget, may correspond to a period that the temperature of the medication in the medication package 18 is controlled according to the thermal control requirements given various environmental characteristics associated with the transportation and delivery of the medication package 18. For example, the thermal packaging determination system may increase or decrease various amounts of required insulation, ice, gel packs, dry ice, moisture capture pouches, and/or other thermal control mechanisms in response to an average climate (e.g., controlled climate, such as on a delivery vehicle, and/or natural climate) acting on the medication package 18 during transportation and/or delivery of the medication package 18.

In some embodiments, the hub station 210 (e.g., via the computing device 100) may selectively control delivery of the medication package 18 (e.g., and other suitable packages) using the UAV 10 and/or the other UAVs 10'. The UAV 10 and the other UAVs 10' may communicate directly with the computing device 100. Additionally, or alternatively, the UAV 10 and the UAVs 10' may communicate directly with one another using a communications network, such as a mesh network or other suitable network, as is generally illustrated in FIG. 3B.

In some embodiments, the computing device 100 may receive various environmental measurements from the UAV 10 and/or the UAVs 10' while the UAV 10 and/or the UAVs 10' during transport of other medication packages along various delivery routes that are proximately located to or include at least part of the delivery route of the medication package 18. For example, a first UAV 10' may measure a current temperature and a current wind velocity of a delivery route being traversed by the first UAV 10' and communicate the current temperature and current wind velocity to the computing device 100. Additionally, or alternatively, a second UAV 10' may measure an amount of sun exposure experienced by the second UAV 10' while the second UAV 10' traverses another delivery route being traversed by the second UAV 10' and may communicate the amount of sun exposure to the computing device 100. The computing device 100 may use the received measurements to estimate the environmental characteristics of the delivery route for the medication package 18.

It should be understood that the computing device 100 may receive a plurality of measurements from a plurality of UAVs over various periods for various delivery routes. The computing device 100 may analyze the plurality of measurements and may estimate various environmental characteristics of the delivery route for the medication package 18. Additionally, or alternatively, the computing device 100 may estimate the environmental characteristics of the delivery route for the medication package 18 using the received measurements, the received environmental information, any other suitable information, or a combination thereof.

In some embodiments, the computing device 100 may identify one or more recipient characteristics or preferences corresponding to a recipient of the medication package 18. For example, the computing device 100 may communicate with a mobile computing device 202. The mobile computing device 202 may correspond to or be associated with the recipient. The mobile computing device 202 may include any suitable mobile computing device, such as a smart phone, a tablet-computing device, and the like.

The mobile computing device 202 may include various application data 208. The application data 208 may include data from various applications on the mobile computing device 202. For example, the application data 208 may include calendar data, global position (e.g., GPS) data or other location data, other suitable data, or a combination thereof. The mobile computing device 202 may include a pharmacy application corresponding to the pharmacy responsible for delivery of the medication package 18. The computing device 100 may communicate with the pharmacy application to provide information and/or notifications corresponding to the medication package 18 to the recipient or to provide other suitable information and/or notifications.

Additionally, or alternatively, the computing device 100 may receive information and/or notifications from the recipient of the medication package 18.

The computing device 100 may receive instructions indicating that the medication package 18 is ready for delivery. The computing device 100 may receive the instructions from a corresponding pharmacy or any suitable source.

The instructions may indicate a delivery destination or location for the medication package 18. The medication package 18 may be transported to the hub station 210 or the hub station 210 may be located at the pharmacy or other suitable location where the medication package 18 is packed. The computing device 100 may determine, as will be described, whether to deliver the medication package 18 to the delivery destination based on various environmental and other information.

In some embodiments, the computing device 100 may be configured to receive one or more authenticated delivery locations from the pharmacy application. For example, the recipient may interact with the pharmacy application and provide one or more delivery locations. The one or more delivery locations may include a residence or home of the recipient, a work location of the recipient, or other suitable locations, or a combination thereof. The recipient may, using the pharmacy application, specify global position system (GPS) coordinates of the one or more delivery locations. The computing device 100 may store the GPS coordinates for each of the one or more delivery locations in an authenticated delivery locations database. The authenticated delivery locations database may include any suitable database and may be located at the hub station 210, at the pharmacy, on a cloud computing device or other remotely located computing device, or any suitable location. Entries in the authenticated delivery locations database may indicate a delivery location name, GPS coordinates corresponding to the delivery location, recipient identification information (e.g., a name, number value assigned to the recipient, other suitable information, or a combination thereof).

Additionally, or alternatively, the recipient may use a microphone on the mobile computing device 202 to provide audible input (e.g., spoken or other sound input) indicating an address or other identifying information of the delivery location. The computing device 100 and/or the controller 20 (e.g., of the UAV 10) may determine the delivery location using the audible input.

Additionally, or alternatively, the recipient may capture an image of the one or more delivery locations using the mobile computing device 202 or another suitable image-capturing device. The recipient may upload the images for each delivery location using the pharmacy application. The pharmacy application may be configured to determine GPS coordinates of each delivery location using corresponding images, an address of the delivery location, other identifying information of the delivery location, or a combination thereof. The pharmacy application may communicate the GPS coordinates of for each delivery location, as described, to the computing device 100. Additionally, or alternatively, the computing device 100 may be configured to determine GPS coordinates of each delivery location using corresponding images, an address of the delivery location, other identifying information of the delivery location, or a combination thereof. The computing device 100 may update the authenticated delivery locations database to include the delivery locations.

In some embodiments, the recipient may use a map application or other suitable application on the mobile computing device 202 to indicate each delivery location. For example, the recipient may open a map application on the mobile computing device 202 and may indicate (e.g., by dropping a pin or other suitable indication) on each of the delivery locations. The pharmacy application interacts with the map application to determine the GPS coordinates of each delivery location. Additionally, or alternatively, the computing device 100 may instruct the UAV 10 or one or more of the UAVs 10' to travel to a location corresponding to the delivery locations and capture image data of the delivery locations. The UAV 10 and/or the UAVs 10' may communicate, via the mesh network, with other UAVs 10' to transfer the image data to the computing device 100. The computing device 100 may store image data corresponding to the delivery locations.

In some embodiments, the computing device 100 may analyze the image data corresponding to each authenticated delivery location. The computing device 100 may utilize or communicate with a neural network (e.g., as a convolutional neural network or other suitable neural network), a computer vision mechanism, or other suitable mechanism, network, or system configured to identify objects in image data. The computing device 100 may identify one or more secure locations for each authenticated delivery location. For example, the computing device 100 may identify a location on a roof of an authenticated delivery location and may indicate in the authenticated delivery locations database the secure location. If the computing device 100 cannot identify a secure location or an authenticated delivery location, the computing device 100 may indicate in the authenticated delivery locations database that the authenticated delivery location does not include a secure location. The secure location for a respective authenticated delivery location may be used, by the UAV 10, or other suitable UAV, to wait for the recipient to receive the medication package 18, as will be described.

It should be understood that the computing device 100 may receive, monitor, or analyze any suitable data instead of or in addition to the data or measurements described herein and may determine whether to deliver the medication package 18 and/or to retrieve the medication package 18 using any suitable data instead of or in addition to the data or measurements described herein. Additionally, or alternatively, the computing device 100 may determine whether to deliver the medication package 18 and/or to retrieve the medication package 18 using any suitable technique in addition to or other than those described herein.

In some embodiments, the computing device 100 may identify one or more location specific characteristics of corresponding to each authenticated delivery location. For example, the hub station 210 may receive from one or more location specific data sources 204, location specific characteristics of the authenticated delivery locations. The location specific data sources 204 may include one or more sensors disposed at each authenticated delivery locations, other suitable sources, or a combination thereof. For example, the computing device 100 may in communication with one or more mobile computing devices at or near a respective authenticated delivery location. The computing device 100 may receive various data from the one or more sensors of one or more mobile computing devices indicating environmental conditions of the authenticated delivery location and/or other suitable data. The computing device 100 may determine whether the environmental conditions may adversely affect the medication package 18, based on the thermal budget of the medication package 18. The computing device 100 may determine to hold the medication package 18 for later delivery, if the computing device 100 determine that the environmental conditions may adversely affect the medication package 18.

In some embodiments, the computing device 100 may receive various location specific information from the UAV 10 and/or the UAVs 10' while the UAV 10 and/or the UAVs 10' depositing other medication packages to the authenticated delivery location (e.g., during previous delivery of other medication packages). For example, the first UAV 10' may capture one or more images of the authenticated delivery location. The one or more images may include images of a deposit location of another medication package, such as a porch, a balcony, or other suitable deposit location. In some embodiments, the computing device 100 may receive location specific information from the mobile computing device 202. For example, the pharmacy application may interact with other applications on the mobile computing device 202 to determine whether a garage door is open at the authenticated delivery location, or other suitable information. The computing device 100 may use the location specific information to instruct the UAV 10 to transport the medication package 18 to the authenticated delivery location.

The computing device 100 may receive instructions indicating that the medication package 18 is ready for delivery. The computing device 100 may receive the instructions from a corresponding pharmacy or any suitable source. The computing device 100 may be configured to determine the recipient associated with the medication package 18. For example, the instructions may indicate the recipient, or the computing device 100 may determine the recipient using any suitable manner. The instructions may indicate a delivery location (e.g. a first delivery location) for the medication package 18. Additionally, or alternatively, the computing device 100 may communicate with the pharmacy application on the mobile computing device 202 to determine the first delivery location. For example, the recipient may interact with the pharmacy application to provide the first delivery location to the computing device 100. The medication package 18 may be transported to the hub station 210 or the hub station 210 may be located at the pharmacy or other suitable location where the medication package 18 is packed.

In some embodiments, the computing device 100 may be configured to identify one or more authenticated delivery locations corresponding to the recipient. For example, the computing device 100 may access the authenticated delivery locations database. The computing device 100 may identify authenticated delivery locations corresponding to the recipient using the authenticated delivery locations database.

The computing device 100 may determine whether the authenticated delivery locations for the recipient includes the first delivery location. As described, the authenticated delivery locations for the recipient may include the residence of the recipient, a workplace of the recipient, a caregiver residence associated with the recipient, and/or any other delivery locations authenticated by the recipient and stored in the authenticated delivery locations database.

If the computing device 100 determines that the authenticated delivery locations for the recipient does not include the first delivery location, the computing device 100 may provide instructions to the pharmacy application indicating, to the recipient, that the first delivery location is not an authenticated delivery location. The instructions may further indicate that the recipient should provide an alternative delivery location and/or that the recipient may be required to provide additional authentication data to receive the medication package 18. Additionally, or alternatively, the instructions may request that the recipient confirm that the first delivery location is authenticated by the recipient for delivery of the medication package 18.

If the computing device 100 determines that the authenticated delivery locations for the recipient includes the first delivery location, the computing device 100 instructs the UAV 10 (e.g., or other suitable UAV) to retrieve the medication package 18 from the hub station 210 (e.g., a starting location). The computing device 100 may instruct the UAV 10 to transport the medication package 18 to the first delivery location.

The UAV 10 may travel to the first delivery location in response to the instructions to transport the medication package 18 to the first delivery location. The computing device 100 may communicate with the pharmacy application an indication that the UAV 10 is traveling to the first delivery location with the medication package 18. The UAV 10 may attempt to release the medication package 18 to the recipient. Before the UAV 10 releases the medication package 18 to the recipient, the UAV 10 may gather authentication data from the recipient. For example, the UAV 10 may use the image-capturing device 26 to scan the face of the recipient. The UAV 10 may include facial recognition software and may identify the recipient using the facial recognition software. The UAV 10 may communicate, using the mesh network, to another UAV 10' or directly to the computing device 100, authentication data indicating that the recipient is the intended recipient of the medication package 18.

In some embodiments, the controller 20 of the UAV 10 may receive or retrieve authentication data that includes a file containing facial recognition data of the recipient (e.g., an image previously authenticated to be the recipient). The controller 20 may compare the image stored in the file with one or more images captured by the image-capturing device 26. If the controller 20 determine that the image stored in the file corresponds to the one or more captured images, the controller 20 may determine that the recipient is the intended recipient. The UAV 10 may communicate, using the mesh network, to another UAV 10' or directly to the computing device 100, authentication data indicating that the recipient is the intended recipient of the medication package 18.

Additionally, or alternatively, the UAV 10 may communicate image data corresponding to the face of the recipient to another UAV 10', using the mesh network. The other UAV 10' may communicate the image data to the computing device 100 or to other UAVs 10', which ultimately communicate the image data to the computing device 100. The computing device 100 may use facial recognition software to identify the recipient. For example, the computing device may receive or retrieve a file that contains the facial recognition data and compare it to the image data received from the UAV 10. The computing device 100 may compare the facial recognition data with the image data. The computing device 100 may determine that the recipient is the intended recipient in response to a determination that the facial recognition data matches the image data.

In some embodiments, the UAV 10 may include a microphone or other suitable audible input device. The recipient may provide an audible input (e.g. by speaking, providing a tone generated by the pharmacy application on the mobile computing device 202, or other suitable audible input). The controller 20 may compare the audible input to a corresponding stored file (e.g., a similar audible input, such as a sample of the speech of the recipient, a corresponding tone, or other suitable audible data or other suitable data). The controller 20 may determine the recipient is the intended recipient based on a determination that the audible input matches the corresponding file.

In some embodiments, the UAV 10 may scan one or more fingerprints of the recipient, using the fingerprint input device, as described. In some embodiments, the UAV 10 may scan one or more retinas of the recipient. The UAV 10 may generate the authentication data using the one or more fingerprints, the one or more retina scans, or a combination thereof. In some embodiments, the UAV 10 may compare the one or more fingerprints and/or the one or more retina scans with stored data that includes one or fingerprints and/or one or more retina scans of the recipient. If the UAV 10 determines that the one or more fingerprints and/or the one or more retina scans match the stored data, the UAV 10 determines that the recipient is the intended recipient.

Additionally, or alternatively, the UAV 10 may scan a QR code or barcode of the recipient. For example, the recipient may receive a QR code or a barcode from the computing device 100 via the pharmacy application, an SMS message, a text message, an email, a phone call, or other suitable QR code source. The recipient may print the QR code or barcode, or the recipient may present the QR code or the barcode on the mobile computing device 202. The UAV 10 may scan the QR code or the barcode and determine the recipient is the intended recipient based on a comparison of the QR code or the barcode to a QR code or barcode communicated to the UAV 10 by the computing device 100.

In some embodiments, the UAV 10 may receive a numeric value from the recipient (e.g., via a keypad input, a touch screen, or other suitable input device of the UAV 10 or a signal from the mobile computing device 202). For example, the recipient may receive a numeric value from the computing device 100 via the pharmacy application. The recipient may provide or input the numeric value to the UAV 10. The UAV 10 may determine the recipient is the intended recipient based on a comparison of the numeric value to a numeric value communicated to the UAV 10 by the computing device 100. It should be understood that the UAV 10 may receive any other suitable authentication data from the recipient in addition to or instead of those described herein.

The UAV 10 may determine that the recipient is the indented recipient of the medication package 18 using the authentication data, as described. Additionally, or alternatively, the UAV 10 may communicate the authentication data, via the mesh network, with the computing device 100. The UAV 10 may determine that the recipient is the intended recipient based on the authentication data. As described, the authentication data may include the input received by the UAV 10, a notification that the UAV 10 has determined that the recipient is the intended recipient, or a combination thereof. It should be understood that the intended recipient may include the recipient associated with the medication package 18 or a care of individual authenticated by the recipient and stored in the authenticated delivery locations database.

If the computing device 100 and/or the UAV 10 determines that the authentication data corresponds to the recipient (e.g., and is the intended recipient), the computing device 100 may instruct the UAV 10 to release the medication package 18 to the recipient. If the computing device 100 and/or the UAV 10 determine that the authentication data does not correspond to the recipient, the computing device 100 may instruct the UAV 10 to return the medication package 18 to the hub station 210 and/or to a secure location (e.g., such as a corresponding pharmacy).

In some embodiments, the UAV 10 may determine that the recipient is unavailable to receive the medication package 18 at the first delivery location. The UAV 10 may communicate, via the mesh network, a notification to the computing device 100 indicating that the recipient is not available. The computing device 100 may instruct and/or the UAV 10 may autonomously determine to identify an authorized deposit location at the first delivery location. For example, the UAV 10 may identify a balcony, an open garage door, and the like using the location specific information, the image data corresponding to the first delivery location, or any other suitable information or data. The UAV 10 may deposit the medication package 18 in the authorized deposit location. In some embodiments, the computing device 100 may instruct the UAV 10 to deposit the medication package 18 in an authorized deposit location indicated in the authenticated delivery locations database.

In some embodiments, if the first delivery location does not include an authorized deposit location, the computing device 100 may instruct and/or the UAV 10 may autonomously determine to identify a secure location of the first delivery location. For example, the computing device 100 may identify a secure location using the authenticated delivery locations database. Additionally, or alternatively, the computing device 100 may receive image data captured by the UAV 10 while the UAV 10 is at the first delivery location. The computing device 100 may analyze the image data, as described, and identify a secure location. The secure location may include a roof or other secure location of the first delivery location.

The computing device 100 may instruct the UAV 10 to wait in the secure location for a first predetermined period or until the UAV 10 determines the recipient is available to receive the medication package 18. If the UAV 10 determines after the predetermine period expires that the recipient is not available, the UAV 10 may return the medication package 18 to the hub station 210. The computing device 100 may communicate, via the pharmacy application, to the recipient that the UAV 10 is waiting in the secure location for the first predetermined period.

The recipient may request an extension of time using the pharmacy application. For example, the recipient may be traveling to the first delivery location and may arrive after the expiration of the first predetermined period. The computing device 100 may receive the extension of time request and may instruct the UAV 10 to remain in the secure location for a second predetermined period or until the UAV 10 determines that, the recipient is available to receive the medication package 18.

In some embodiments, the computing device 100 may receive a reroute request from the recipient, via the pharmacy application, indicating a desire to change the delivery location to a second delivery location. For example, the recipient may have to leave the first delivery location during the period that the medication package 18 will be delivered. The computing device 100 may determine whether the authenticated delivery locations for the recipient includes the second delivery location, as described. If the second delivery location is an authenticated delivery location, the computing device 100 instructs the UAV 10 to reroute the medication package 18 to the second delivery location.

If the computing device 100 determines that the authenticated delivery locations does not include the second delivery location, the computing device 100 may provide instructions to via pharmacy application indicating, to the recipient, that the second delivery location is not an authenticated delivery location. The instructions may further indicate that the recipient should provide an alternative delivery location and/or that the recipient may be required to provide additional authentication data to receive the medication package 18. The instructions may request that the recipient confirm that the second delivery location is authenticated by the recipient for delivery of the medication package 18. Additionally, or alternatively, the computing device 100 may instruct the UAV 10 to transport the medication package 18 to a secure location or to the hub station 210.

In some embodiments, the computing device 100 may receive, via the pharmacy application, from the recipient a reroute request indicating a dynamic delivery location. For example, the recipient may be traversing a public location, such as a mall, office complex, or other public location. The computing device 100 may identify location information corresponding to the mobile computing device 202. The computing device 100 may instruct the UAV 10 to transport the medication package 18 to an identified location of the recipient, using the location information. The computing device 100 and/or the UAV 10 may determine that the recipient is the intended recipient using the authentication data, as described.

If the computing device 100 and/or the UAV 10 determines that the recipient is the intended recipient, the UAV 10 release the medication package 18 to the recipient. Conversely, if the computing device 100 and/or the UAV 10 determines that the recipient is not the intended recipient, the computing device 100 may instruct the UAV 10 to transport the medication package 18 to a secure location or to the hub station 210.

In some embodiments, the computing device 100 may, in response to a determination that the one or more authenticated delivery locations includes the first delivery location, identify, using a UAV registry, one or more UAVs based on at least one UAV characteristic associated with the medication delivery request. For example, the medication delivery request may include information corresponding to the delivery of the medication package 18 and one or more characteristics of the UAV to deliver the medication package 18. The at least one UAV characteristic may include at least one of a UAV range, a UAV speed, a UAV payload capacity, a UAV security feature (e.g., such as facial recognition capabilities, finger print capabilities, any other security feature including those described or not described herein, or a combination thereof), a UAV temperature control feature (e.g., corresponding to a capability of the UAV to control temperature of a payload or the humidity in the payload), any other suitable characteristic, or a combination thereof.

The UAV registry may include any suitable registry and may be stored in a database, remotely located computing device, a proximate computing device, on the computing device 100, or any suitable location. In some embodiments, the UAVs registered in the UAV registry may include UAVs owned by the pharmacy system and/or owned by recipients of the medication packages or other individuals. For example, as the use and ownership of such UAVs becomes more ubiquitous, various owners of such UAVs may allow others, such as the pharmacy system and/or user of the hub station 200 or the computing device 100, to selectively utilize the UAV for purposes of package delivery and retrieval or other suitable applications or uses. This may allow the user of the computing device 100 to access and operate UAVs that are owned by other individuals, thereby taking advantage of idle UAVs in a geographic area proximate to a delivery location. In some embodiments, the owners of the UAVs may receive a reward for use of the UAVs, such as a cash reward, a discount on medications or other goods or services associated with the pharmacy system, and the like.

In some embodiments, the computing device 100 may receive from the owner of a UAV via a suitable computing device, registration information corresponding to the UAV. The registration information may include UAV identification information, UAV size information, UAV battery capacity information, UAV payload capacity information, UAV temperature control feature information, UAV moisture control information UAV security feature information, UAV range information, UAV speed information, and the like. This data can be built into a structured table with the first flag in the table being whether this entry is needed for the delivery package being carried by the UAV. This will allow the UAV to only expend energy on the characteristics needed for deliver. For example, if the package requires humidity control by not temperature control, the power for cooling, e.g., a piezoelectric element, is off, but a humidifier is powered. If the delivery confirmation is a comparison of a voice recorded by the UAV and compared to a recorded audio file of the person and not a visual check, the camera or imager is powered off or at a lower level with the microphone being powered on at the delivery sight. Being powered on is the circuitry of that device receiving its operational voltage and current to be fully powered and operational. In some embodiments, the computing device 100 may be configured to retrieve UAV information based on a UAV identification (e.g., model number, serial number, and the like) by the owner of the UAV.

The computing device 100 may perform authentication, certification, and/or credentialing for each UAV identification received from owners of various UAVs. For example, the computing device 100 may verify, using any authentication technique (e.g., such as an authentication email or other suitable technique), the ownership of the UAV. Additionally, or alternatively, the computing device 100 may retrieve from a data repository data associated with a UAV (e.g., using model number, serial number, and the like). The computing device 100 may certify features of the UAV based on the data retrieved from the data repository. The computing device 100 may store, in the registry, information associated with each UAV, including, but not limited to, the UAV identification information, the UAV feature information, and the like.

In some embodiments, the computing device 100 may determine that a UAV is no longer available for use. For example, the computing device 100 may determine that the UAV is out of commission, blacklisted, lost, stolen, and the like. For example, the computing device 100 may receive information from the owner of the UAV indicating that the UAV is no longer available. Additionally, or alternatively, the computing device 100 may determine, based on past performance of a UAV, that the UAV should no longer be available for use. The computing device 100 may update an out of commission registry. The out of commission registry may include information for UAVs no longer available for use.

In some embodiments, the computing device 100 may determine, for each UAV of the one or more UAVs, an availability status. For example, the computing device 100 may determine whether a UAV is available for use using the out of commission registry (e.g., if the computing device 100 determines the UAV is on the out of commission registry, the computing device 100 may determine that the UAV is no longer available for use). Additionally, or alternatively, the computing device 100 may communicate with each UAV using any suitable communication protocol or technique, to determine a current availability status of each UAV. If the computing device 100 determines that a UAV is not on the out of commission registry and the computing device 100 determines, via the communication with the UAV, that the UAV is available, the computing device 100 may determine that the availability status for the UAV is available. Alternatively, the computing device 100 may determine that the UAV is not available if the UAV is on the out of commission registry and/or the communication with the UAV indicates that the UAV is not currently available for use.

In some embodiments, the computing device 100 may determine whether a UAV is available for use based on a predefined availability schedule stored in the UAV registry. Additionally, or alternatively, the computing device 100 may receive, from a UAV, an availability schedule.

The computing device 100 may select a UAV, such as the UAV 10, of the one or more UAVs based on at least a corresponding availability status of the UAV 10 (e.g., indicating that the UAV 10 is available) and at least one selection criteria. The selection criteria may include any suitable criteria, including, but not limited to, a total distance threshold (e.g., corresponding to a total distance to be traveled by the UAV), a state of charge of a battery threshold (e.g., corresponding to a state of charge of the battery of the UAV), a payload capacity (e.g., corresponding to a minimum or maximum payload capacity of the UAV), other suitable criteria, or a combination thereof. The computing device 100 may instruct the UAV 10 to transport the medication package 18 from a starting location to the first delivery location, as described.

In some embodiments, the computing device 100 may, in response to the UAV 10 communicating authentication data, determine whether the authentication data corresponds to the recipient. The computing device 100 may, in response to a determination that the authentication data corresponds to the recipient, instruct the UAV 10 to release the medication package 18 to the recipient.

In some embodiments, the computing device 100 may, in response to a determination that the UAV 10 did not communicate authentication data, determine whether the first delivery location includes an authorized deposit location. The computing device 100 may, in response to a determination that the first delivery location includes an authorized deposit location, instruct the UAV 10 to deposit the medication package 18 at the authorized deposit location.

In some embodiments, the computing device 100 may, in response to a determination that the first delivery location does not include an authorized deposit location, instruct the UAV 10 to identify a secure location at the first delivery location. The computing device 100 may instruct the UAV 10 to wait a first predetermined period at the secure location.

In some embodiments, the computing device 100 may receive a time extension request from the recipient. The computing device 100 may instruct the UAV 10 to wait a second predetermined period at the secure location.

In some embodiments, computing device 100 may, in response to a receiving a reroute request from the recipient indicating a second delivery location, determine whether the one or more authenticated delivery locations includes the second delivery location. The computing device 100 may, in response to a determination that the one or more authenticated delivery locations includes the second delivery location, instruct the UAV 10 to one of transport the medication package 18 to the second delivery location and transfer the medication package 18 to another UAV, such as the UAV 10' based on at least a state of charge of a battery of the UAV 10. For example, if the computing device 100 determines that the state of charge of the battery of the UAV 10 is insufficient to deliver the medication package 18, the computing device 100 may identify another UAV, such as the UAV 10'. The computing device 100 may instruct the UAV 10' to travel to the UAV 10 and retrieve the medication package 18. The computing device 100 may instruct the UAV 10' to deliver the medication package 18.

Additionally, or alternatively, the computing device 100 may use the UAV 10' as a charging base and may instruct the UAV 10' to charge the battery of the UAV 10. Additionally, or alternatively, the computing device 100 may instruct the UAV 10 to travel to a charging base station. The charging base station may be a public charging base station, a charging base station associated with a UAV on the UAV registry, or other suitable charging base station. For example, the computing device 100 may identify a charging base station of a UAV on the UAV registry within a predefined distance from the UAV 10. The computing device 100 may instruct the UAV 10 to travel to the charging base station. The computing device 100 may, using the UAV 10, negotiate with one or more security protocols associated with the charging base station (e.g., a monitored doorbell, camera, and the like). The computing device 100 may, using the UAV 10, provide credentials that allow the security protocols to pass the UAV 10 to the charging base station. The computing device 100 may instruct the UAV 10 to continue with the medication package 18 delivery after the battery of the UAV 10 is suitably charged.

In some embodiments, the computing device 100 may, in response to a receiving a reroute request from the recipient indicating a dynamic delivery location, identify location information corresponding to a mobile computing device associated with the recipient. The computing device 100 may instruct the UAV 10 (e.g., or other UAV) to transport the medication package 18 to an identified location of the recipient. The identified location may be identified based on the location information.

In some embodiments, the computing device 100 may communicate with smart device, such as a smart vehicle, a smart dropbox, a smart locker, or other suitable smart device. The smart device may be associated with the recipient. For example, the recipient may own or have access to a smart vehicle. The computing device 100 may communicate with the smart vehicle. The computing device 100 may request the smart vehicle open a window, door, trunk lid, or other suitable compartment of the smart vehicle. The computing device 100 may instruct the UAV 10 to deposit the medication package 18 in the compartment of the smart vehicle.

In some embodiments, the computing device 100 and/or the system 200 may perform the methods described herein. However, the methods described herein as performed by the computing device 100 and/or the system 200 are not meant to be limiting, and any type of software executed on a computing device or a combination of various computing devices can perform the methods described herein without departing from the scope of this disclosure.

Figure 4:
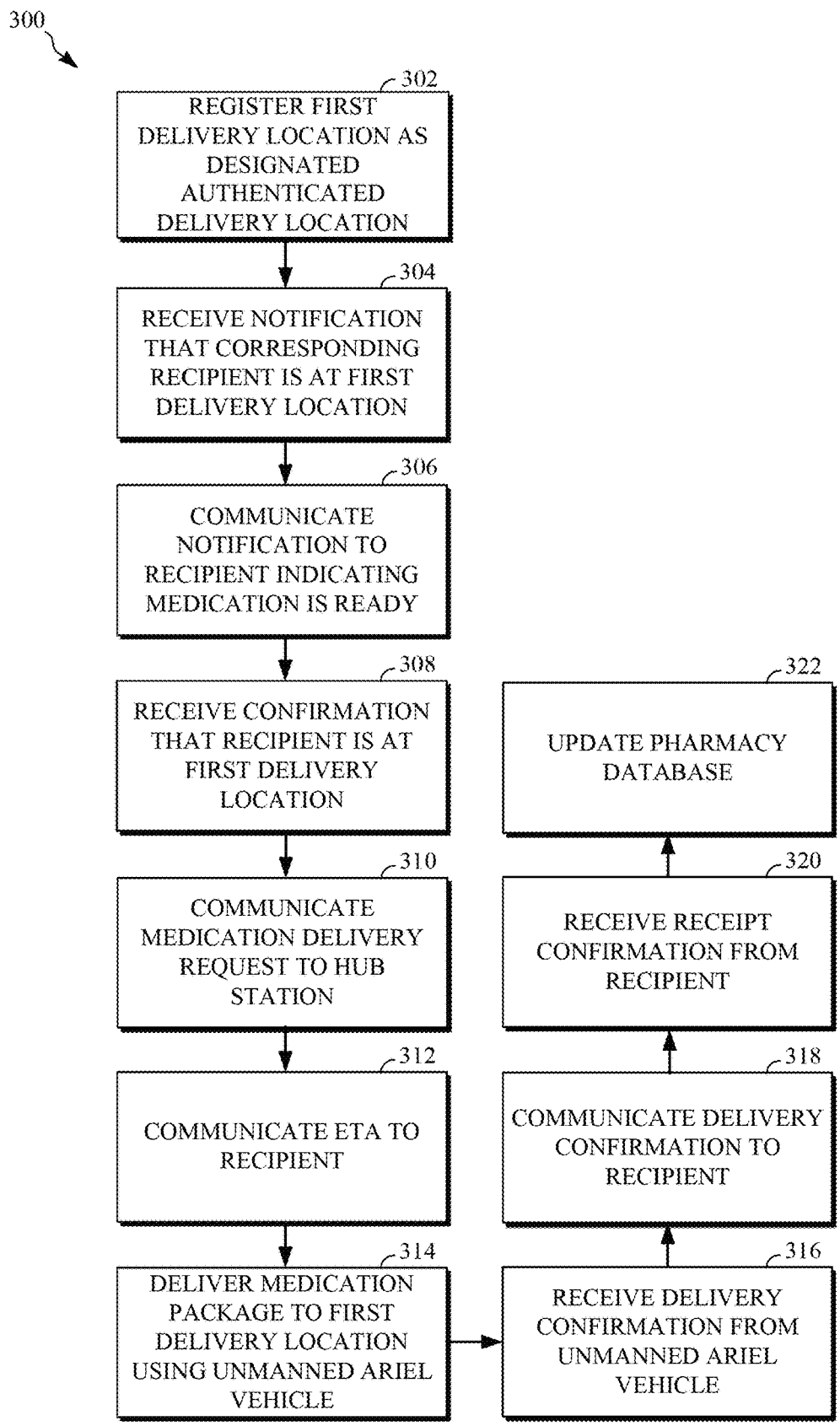
FIG. 4 is a flow diagram generally illustrating a delivery location designation method according to the principles of the present disclosure.

FIG. 4 is a flow diagram generally illustrating a delivery location designation method 300 according to the principles of the present disclosure. At 302, the method 300 registers a first delivery location as a designated authenticated delivery location. For example, the computing device 100 may register one or more delivery locations, including the first delivery location, the second delivery location, other delivery locations, or a combination thereof as authenticated delivery locations in the authenticated delivery locations database.

At 304, the method 300 receives notification that a corresponding recipient is at the first delivery location. For example, the computing device 100 may receive a notification, via the pharmacy application, that the recipient corresponding to the medication package 18 is at the first delivery location.

At 306, the method 300 communicates a notification to the recipient indicating the medication is ready. For example, the computing device 100 communicates a notification, using the pharmacy application, indicating that the medication package 18 is ready for delivery to the recipient.

At 308, the method 300 receives a confirmation that the recipient is at the first delivery location. For example, the computing device 100 receives a notification, via the pharmacy application, from the recipient confirming that the recipient is at the first delivery location.

At 310, the method 300 communicates a medication delivery request to a hub station. For example, the computing device 100 of the hub station 210 receives the medication delivery request from the pharmacy responsible for the medication package 18.

At 312, the method 300 communicates an estimated time of arrival (ETA) to the recipient. For example, the computing device 100 communications a notification, via the pharmacy application, indicating an ETA for delivery of the medication package 18.

At 314, the method 300 delivers the medication package to the first delivery location using an unmanned aerial vehicle. For example, the computing device 100 instructs the UAV 10 to transport the medication package 18 to the first delivery location.

At 316, the method 300 receives delivery confirmation from the unmanned aerial vehicle. For example, the computing device 100 receives a notification, via the mesh network, from the UAV 10 indicating that the UAV 10 released the medication package 18 to the recipient and/or deposited the medication package 18 in an authorized deposit location of the first delivery location.

At 318, the method 300 communicates a delivery confirmation to the recipient. For example, the computing device 100 communicates a notification, via the pharmacy application, to the recipient indicating that the UAV 10 has released the medication package 18 to the recipient and/or deposited the medication package 18 in the authorized deposit location of the first delivery location.

At 320, the method 300 receives a receipt confirmation from the recipient. For example, the computing device 100 receives a notification, via the pharmacy application, indicating that the recipient is in receipt of the medication package 18.

At 322, the method 300 updates a pharmacy database. For example, the computing device 100 updates a pharmacy database indicating that the medication package 18 has been delivered to the recipient. The pharmacy database may include any suitable database and may be located at the hub station 210, at the pharmacy, on a cloud-computing device or other remotely located computing device, or any suitable location.

Figure 5:
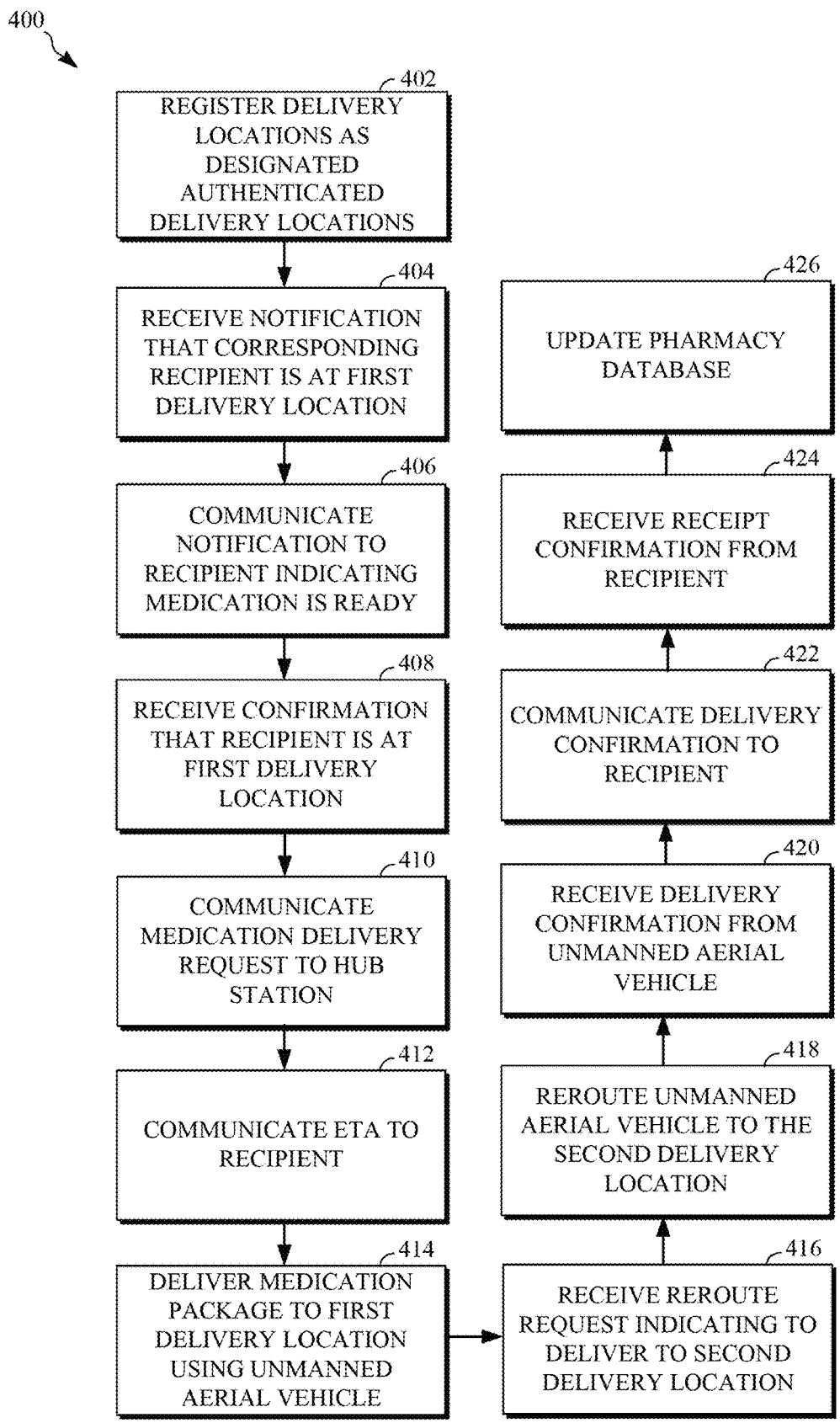
FIG. 5 is a flow diagram generally illustrating a medication package re-routing method according to the principles of the present disclosure.

FIG. 5 is a flow diagram generally illustrating a medication package re-routing method 400 according to the principles of the present disclosure. At 402, the method 400 registers delivery locations as designated authenticated delivery locations. For example, the computing device 100 may register one or more delivery locations, including the first delivery location, the second delivery location, other delivery locations, or a combination thereof as authenticated delivery locations in the authenticated delivery locations database.

At 404, the method 400 receives notification that a corresponding recipient is at the first delivery location. For example, the computing device 100 may receive a notification, via the pharmacy application, that the recipient corresponding to the medication package 18 is at the first delivery location.

At 406, the method 400 communicates a notification to the recipient indicating the medication is ready. For example, the computing device 100 communicates a notification, using the pharmacy application, indicating that the medication package 18 is ready for delivery to the recipient.

At 408, the method 400 receives a confirmation that the recipient is at the first delivery location. For example, the computing device 100 receives a notification, via the pharmacy application, from the recipient confirming that the recipient is at the first delivery location.

At 410, the method 400 communicates a medication delivery request to a hub station. For example, the computing device 100 of the hub station 210 receives the medication delivery request from the pharmacy responsible for the medication package 18.

At 412, the method 400 communicates an ETA to the recipient. For example, the computing device 100 communications a notification, via the pharmacy application, indicating an ETA for delivery of the medication package 18.

At 414, the method 400 delivers the medication package to the first delivery location using an unmanned aerial vehicle. For example, the computing device 100 instructs the UAV 10 to transport the medication package 18 to the first delivery location.

At 416, the method 400 receives a reroute request indication to deliver the medication package to a second delivery location. For example, the computing device 100 receives a notification, via the pharmacy application, from the recipient indicating that the recipient desires to change the delivery of the medication package 18 from the first delivery location to the second delivery location. The computing device 100 may receive the reroute request while the UAV 10 is traveling to the first delivery location and/or as the UAV 10 is reaching the first delivery location. Accordingly, the method 400 may perform operation 416 prior to the UAV 10 completing transposition of the medication package 18 to the first delivery location.

At 418, the method 400 reroutes the unmanned aerial vehicle to the second delivery location. For example, the computing device 100 instructs, using the mesh network, the UAV 10 to reroute delivery of the medication package 18 from the first delivery location to the second delivery location. In some embodiments, the computing device 100 may communicate directly to the UAV 10 (e.g., using other suitable communications mechanisms, such as those described herein).

At 420, the method 400 receives delivery confirmation from the unmanned aerial vehicle. For example, the computing device 100 receives a notification, via the mesh network, from the UAV 10 indicating that the UAV 10 released the medication package 18 to the recipient and/or deposited the medication package 18 in an authorized deposit location of the second delivery location.

At 422, the method 400 communicates a delivery confirmation to the recipient. For example, the computing device 100 communicates a notification, via the pharmacy application, to the recipient indicating that the UAV 10 has released the medication package 18 to the recipient and/or deposited the medication package 18 in the authorized deposit location of the second delivery location.

At 424, the method 4000 receives a receipt confirmation from the recipient. For example, the computing device 100 receives a notification, via the pharmacy application, indicating that the recipient is in receipt of the medication package 18.

At 426, the method 400 updates a pharmacy database. For example, the computing device 100 updates a pharmacy database indicating that the medication package 18 has been delivered to the recipient.

Figure 6:
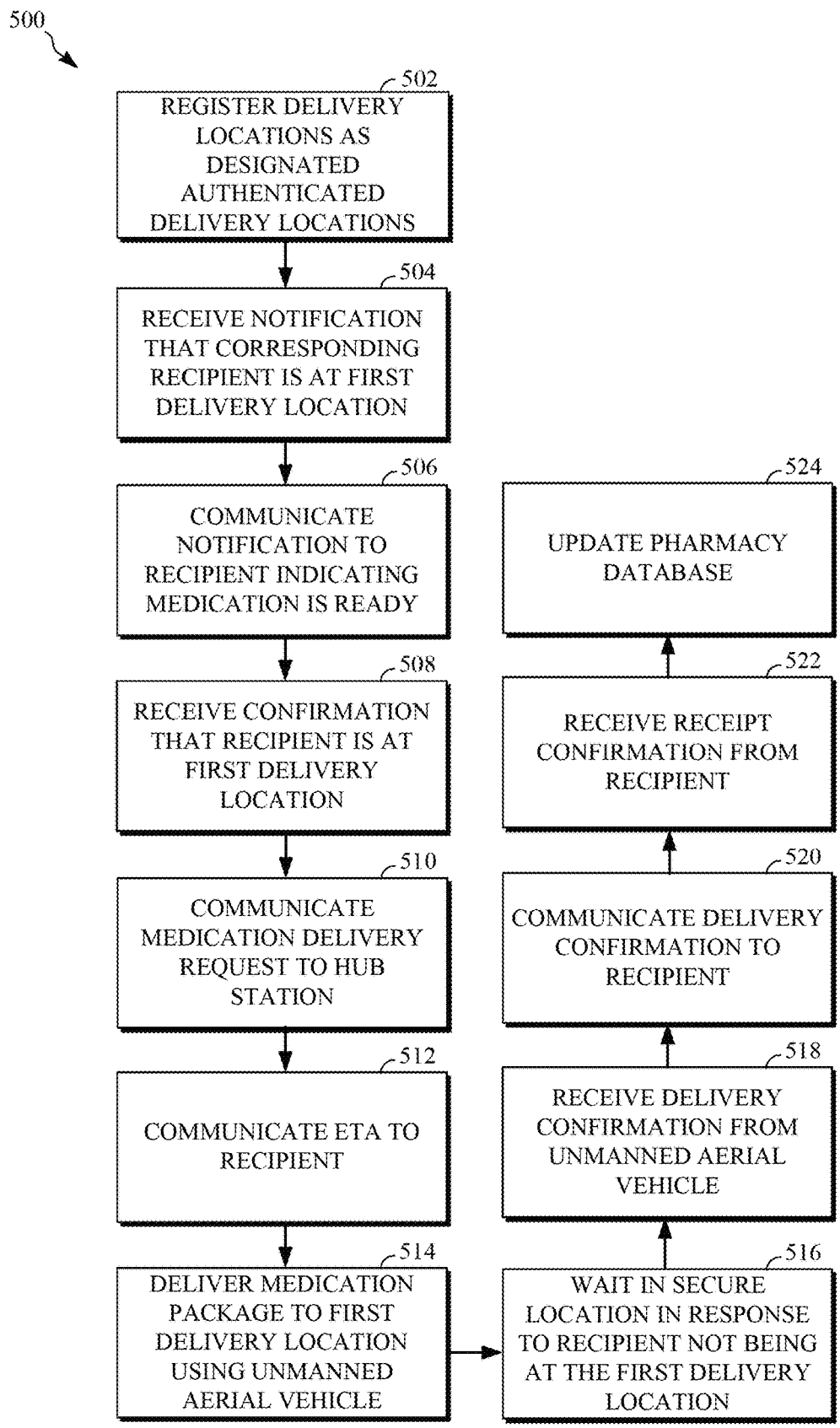
FIG. 6 is a flow diagram generally illustrating a secure medication package delivery method according to the principles of the present disclosure.

FIG. 6 is a flow diagram generally illustrating a secure medication package delivery method 500 according to the principles of the present disclosure. At 502, the method 500 registers delivery locations as designated authenticated delivery locations. For example, the computing device 100 may register one or more delivery locations, including the first delivery location, the second delivery location, other delivery locations, or a combination thereof as authenticated delivery locations in the authenticated delivery locations database.

At 504, the method 500 receives notification that a corresponding recipient is at the first delivery location. For example, the computing device 100 may receive a notification, via the pharmacy application, that the recipient corresponding to the medication package 18 is at the first delivery location.

At 506, the method 500 communicates a notification to the recipient indicating the medication is ready. For example, the computing device 100 communicates a notification, using the pharmacy application, indicating that the medication package 18 is ready for delivery to the recipient.

At 508, the method 500 receives a confirmation that the recipient is at the first delivery location. For example, the computing device 100 receives a notification, via the pharmacy application, from the recipient confirming that the recipient is at the first delivery location.

At 510, the method 500 communicates a medication delivery request to a hub station. For example, the computing device 100 of the hub station 210 receives the medication delivery request from the pharmacy responsible for the medication package 18.

At 512, the method 500 communicates an ETA to the recipient. For example, the computing device 100 communications a notification, via the pharmacy application, indicating an ETA for delivery of the medication package 18.

At 514, the method 500 delivers the medication package to the first delivery location using an unmanned aerial vehicle. For example, the computing device 100 instructs the UAV 10 to transport the medication package 18 to the first delivery location.

At 516, the method 500 waits in a secure location in response to the recipient not being at the first delivery location. For example, the UAV 10 may determine that the recipient is not at the first delivery location. The computing device 100 instructs the UAV 10 to wait in a secure location of the first delivery location for the first predetermined period. Additionally, or alternatively, the recipient may communicate, via the pharmacy application, that the recipient will not be at the first delivery location when the UAV 10 arrives. The computing device 100 may instruct the UAV 10 to wait, for the first predetermined period, in the secure location in response to the notification from the recipient. As described, the computing device 100 may receive a request to wait a second predetermined period, via the pharmacy application, from the recipient.

At 518, the method 500 receives delivery confirmation from the unmanned aerial vehicle. For example, the computing device 100 receives a notification, via the mesh network, from the UAV 10 indicating that the UAV 10 released the medication package 18 to the recipient and/or deposited the medication package 18 in an authorized deposit location of the first delivery location.

At 520, the method 500 communicates a delivery confirmation to the recipient. For example, the computing device 100 communicates a notification, via the pharmacy application, to the recipient indicating that the UAV 10 has released the medication package 18 to the recipient and/or deposited the medication package 18 in the authorized deposit location of the first delivery location.

At 522, the method 500 receives a receipt confirmation from the recipient. For example, the computing device 100 receives a notification, via the pharmacy application, indicating that the recipient is in receipt of the medication package 18.

At 524, the method 500 updates a pharmacy database. For example, the computing device 100 updates a pharmacy database indicating that the medication package 18 has been delivered to the recipient.

Figure 7:
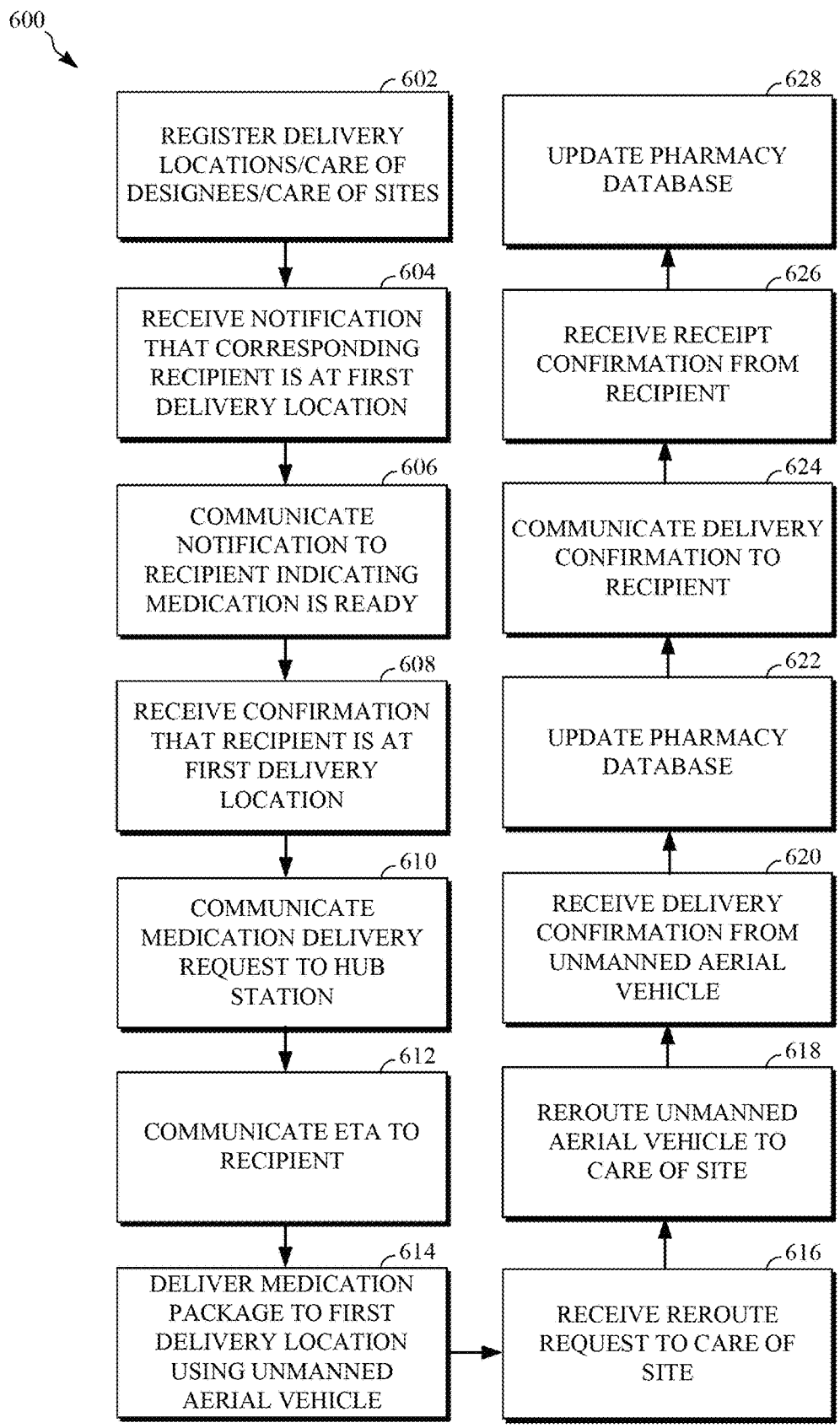
FIG. 7 is a flow diagram generally illustrating a care of designation method according to the principles of the present disclosure.

FIG. 7 is a flow diagram generally illustrating a care of designation method 600 according to the principles of the present disclosure. At 602, the method 600 registers a delivery location and/or care of designees and/or care of sites as a designated authenticated delivery location. For example, the computing device 100 may register one or more delivery locations, including the first delivery location, the second delivery location, other delivery locations, or a combination thereof as authenticated delivery locations in the authenticated delivery locations database. Additionally, or alternatively, the recipient may communicate, via the pharmacy application, one or more care of designees (e.g., one or more individuals authorized by the recipient to receive the medication package 18 for the recipient) and/or one or more care of sites (e.g., locations authorized by the recipient to receive the medication package 18 for the recipient).

At 604, the method 600 receives notification that a corresponding recipient is at the first delivery location. For example, the computing device 100 may receive a notification, via the pharmacy application, that the recipient corresponding to the medication package 18 is at the first delivery location.

At 606, the method 600 communicates a notification to the recipient indicating the medication is ready. For example, the computing device 100 communicates a notification, using the pharmacy application, indicating that the medication package 18 is ready for delivery to the recipient.

At 608, the method 600 receives a confirmation that the recipient is at the first delivery location. For example, the computing device 100 receives a notification, via the pharmacy application, from the recipient confirming that the recipient is at the first delivery location.

At 610, the method 600 communicates a medication delivery request to a hub station. For example, the computing device 100 of the hub station 210 receives the medication delivery request from the pharmacy responsible for the medication package 18.

At 612, the method 600 communicates an ETA to the recipient. For example, the computing device 100 communicates a notification, via the pharmacy application, indicating an ETA for delivery of the medication package 18.

At 614, the method 600 delivers the medication package to the first delivery location using an unmanned aerial vehicle. For example, the computing device 100 instructs the UAV 10 to transport the medication package 18 to the first delivery location.

At 616, the method 600 receives a reroute request to a care of site. For example, the computing device 100 receives, via the pharmacy application, from the recipient a reroute request indicating the recipient desires to change delivery of the medication package 18 from the first delivery location to a care of site.

At 618, the method 600 reroutes the unmanned aerial vehicle to the care of site. For example, the computing device 100 instructs the UAV 10 to reroute delivery of the medication package 18 from the first delivery location to the care of site.

At 620, the method 600 receives delivery confirmation from the unmanned aerial vehicle. For example, the computing device 100 receives a notification, via the mesh network or other communications network (e.g., cellular, 3G, 4G, 5G, LTE, or other suitable communications networks described herein), from the UAV 10 indicating that the UAV 10 released the medication package 18 to the recipient and/or deposited the medication package 18 in an authorized deposit location of the care of site.

At 622, the method 600 updates the pharmacy database. For example, the computing device 100 updates the pharmacy database indicating that the UAV 10 deposited the medication package 18 at the care of site.

At 624, the method 600 communicates a delivery confirmation to the recipient. For example, the computing device 100 communicates a notification, via the pharmacy application, to the recipient indicating that the UAV 10 has released the medication package 18 to the recipient and/or deposited the medication package 18 in the authorized deposit location of the care of site.

At 626, the method 600 receives a receipt confirmation from the recipient. For example, the computing device 100 receives a notification, via the pharmacy application, indicating that the recipient is in receipt of the medication package 18.

At 628, the method 600 updates a pharmacy database. For example, the computing device 100 updates a pharmacy database indicating that the medication package 18 has been delivered to the recipient.

Figure 8:
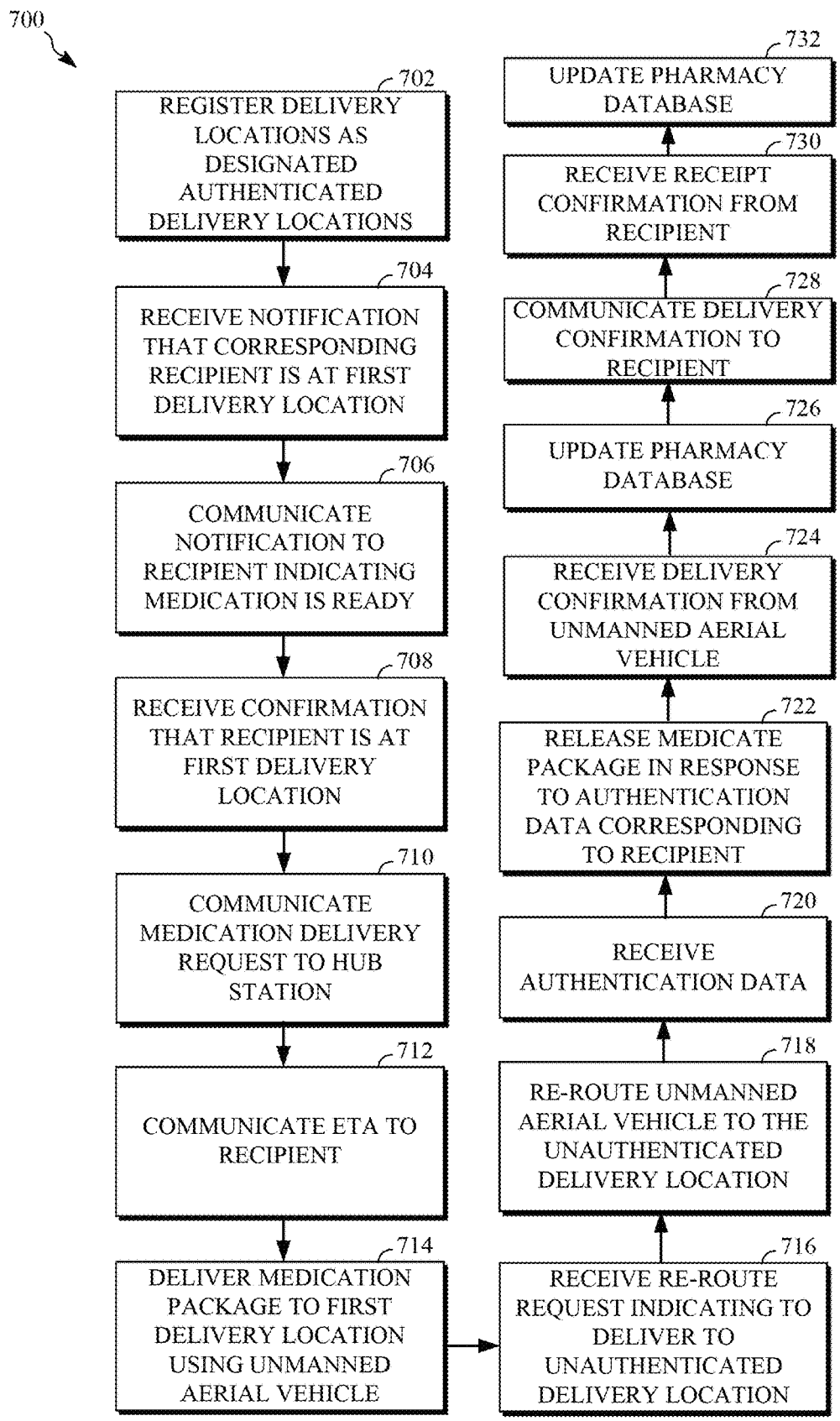
FIG. 8 is a flow diagram generally illustrating an alternative secure medication package delivery method according to the principles of the present disclosure.

FIG. 8 is a flow diagram generally illustrating an alternative secure medication package delivery method 700 according to the principles of the present disclosure. At 702, the method 700 registers delivery locations and/or care of designees and/or care of sites as designated authenticated delivery locations. For example, the computing device 100 may register one or more delivery locations, including the first delivery location, the second delivery location, other delivery locations, or a combination thereof as authenticated delivery locations in the authenticated delivery locations database.

At 704, the method 700 receives notification that a corresponding recipient is at the first delivery location. For example, the computing device 100 may receive a notification, via the pharmacy application, that the recipient corresponding to the medication package 18 is at the first delivery location.

At 706, the method 700 communicates a notification to the recipient indicating the medication is ready. For example, the computing device 100 communicates a notification, using the pharmacy application, indicating that the medication package 18 is ready for delivery to the recipient.

At 708, the method 700 receives a confirmation that the recipient is at the first delivery location. For example, the computing device 100 receives a notification, via the pharmacy application, from the recipient confirming that the recipient is at the first delivery location.

At 710, the method 700 communicates a medication delivery request to a hub station. For example, the computing device 100 of the hub station 210 receives the medication delivery request from the pharmacy responsible for the medication package 18.

At 712, the method 700 communicates an ETA to the recipient. For example, the computing device 100 communicates a notification, via the pharmacy application, indicating an ETA for delivery of the medication package 18.

At 714, the method 700 delivers the medication package to the first delivery location using an unmanned aerial vehicle. For example, the computing device 100 instructs the UAV 10 to transport the medication package 18 to the first delivery location.

At 716, the method 700 receives a reroute request to deliver the medication package to an unauthenticated delivery location. For example, the computing device 100 receives, via the pharmacy application, from the recipient a reroute request indicating the recipient desires to change delivery of the medication package 18 from the first delivery location to an unauthenticated delivery location. The unauthenticated delivery location may include a public location, such as the dynamic delivery location, as described.

At 718, the method 700 reroutes the unmanned aerial vehicle to the unauthenticated delivery location. For example, the computing device 100 instructs the UAV 10 to reroute delivery of the medication package 18 from the first delivery location to the unauthenticated delivery location.

At 720, the method 700 receives authentication data. For example, the computing device 100 receives the authentication data via the UAV 10, as described. The authentication data may include any combination of authentication data described herein. The computing device 100 and/or the UAV 10 determine whether the recipient is the intended recipient based on the authentication data, as described.

At 722, the method 700 releases the medication package in response to the authentication data corresponding to the recipient. For example, the computing device 100 instructs the UAV 10 to release the medication package 18 in response to the determination that the authentication data corresponds to the recipient (e.g., the authentication data indicates that the recipient is the intended recipient).

At 724, the method 700 receives delivery confirmation from the unmanned aerial vehicle. For example, the computing device 100 receives a notification, via the mesh network, from the UAV 10 indicating that the UAV 10 released the medication package 18 to the recipient and/or deposited the medication package 18 in an authorized deposit location of the unauthenticated delivery location and to the recipient.

At 726, the method 700 updates the pharmacy database. For example, the computing device 100 updates the pharmacy database indicating that the UAV 10 deposited the medication package 18 at the unauthenticated delivery location and to the recipient.

At 728, the method 700 communicates a delivery confirmation to the recipient. For example, the computing device 100 communicates a notification, via the pharmacy application, to the recipient indicating that the UAV 10 has released the medication package 18 to the recipient and/or deposited the medication package 18 in the authorized deposit location of the unauthenticated delivery location and to the recipient.

At 730, the method 700 receives a receipt confirmation from the recipient. For example, the computing device 100 receives a notification, via the pharmacy application, indicating that the recipient is in receipt of the medication package 18.

At 732, the method 700 updates a pharmacy database. For example, the computing device 100 updates a pharmacy database indicating that the medication package 18 has been delivered to the recipient.

Figure 9:
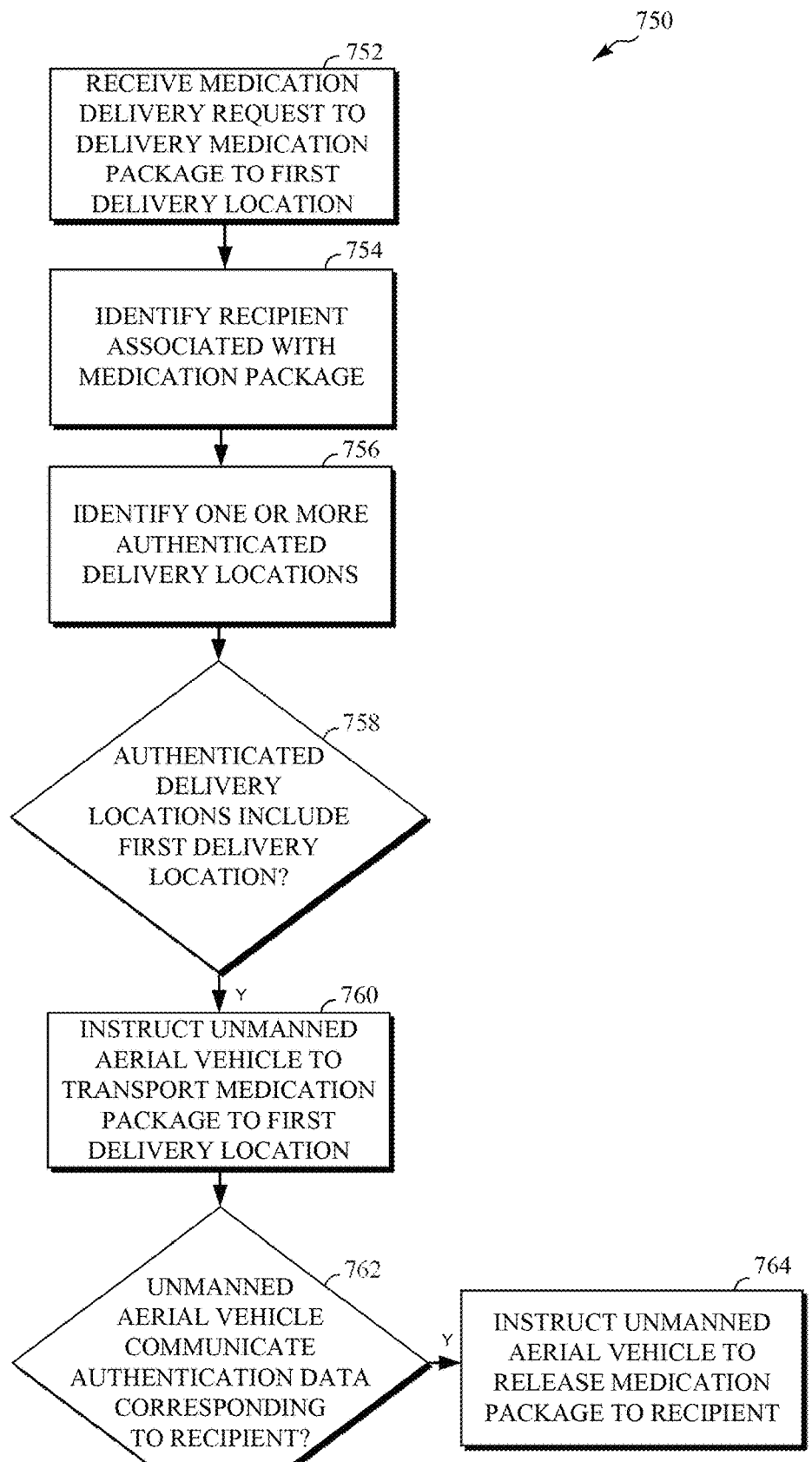
FIG. 9 is a flow diagram generally illustrating an alternative secure medication package delivery method according to the principles of the present disclosure.

FIG. 9 is a flow diagram generally illustrating an alternative secure medication package delivery method 750 according to the principles of the present disclosure. At 752, the method 750 receives a medication request to deliver a medication package to a first delivery location. For example, the computing device 100 receives the medication delivery request from the pharmacy or other suitable location to deliver the medication package 18.

At 754, the method 750 identifies a recipient associated with the medication package. For example, the computing device 100 identifies the recipient of the medication package 18, as described.

At 756, the method 750 identifies one or more authenticated delivery locations. For example, the computing device 100 may access the authenticated delivery locations database. The computing device 100 may identify one or more authenticated delivery locations corresponding to the recipient using the authenticated delivery locations database.

At 758, the method 750 determines whether the authenticated delivery locations include the first delivery location. For example, the computing device 100 determines whether the one or more authenticated delivery locations includes the first delivery location. If the computing device 100 determines that the one or more authenticated delivery locations includes the first delivery location, the method 750 continues at 760. If the computing device 100 determines the one or more authenticated delivery locations does not include the first delivery location, the method 750 may end or may provide instructions to the recipient, via the pharmacy application, as described.

At 760, the method 750 instructs an unmanned aerial vehicle to transport the medication package to the first delivery location. For example, the computing device 100 instructs the UAV 10 to transport the medication package 18 to the first delivery location.

At 762, the method 750 determines whether the unmanned aerial vehicle communicate authentication data corresponding to the recipient. For example, the computing device 100 determines whether the UAV 10 communicated the authentication data and that, the authentication data corresponds to the recipient. If the computing device 100 determines that the UAV 10 communicated the authentication data and that the authentication data corresponds to the recipient, the method 750 continues at 764. If the computing device 100 determines that the UAV 10 did not communicate the authentication data and/or that the authentication data does not correspond to the recipient, the method 750 may end or may instruct the UAV 10 to return the medication package 18 to the hub station 210 or a secure location.

At 764, the method 750 instructs the unmanned aerial vehicle to release the medication package to the recipient. For example, the computing device 100 instructs the UAV 10 to release the medication package 18 to the recipient.

In some embodiments, the UAV 10 my use image processing for package delivery authentication. The UAV 10 may take an image of a recipient for facial recognition. The UAV 10 may take an image of the environment at the delivery location. The UAV 10 may take an image of the mobile computing device 202. The mobile computing device 202 may display a code or a user selected image for authentication. The user selected image may include a stock image from the pharmacy system or an image uploaded by the recipient (e.g., through an app running in the mobile computing device 202, which allows for images to the uploaded and stored in the pharmacy database and associated with the recipient). These images may be compared to stored images in the UAV 10 to authenticate delivery of the medication package 18.

In some embodiments, the facial recognition performed by the UAV 10 includes using a computing device to compare a captured authentication image with the stored image, and determine whether or not the images are sufficiently similar to each other for facial recognition authentication. For example, the UAV 10 may utilize one or more facial recognition programs to compare metrics associated with the captured image to metrics associated with the stored image. The metrics may include distances between facial elements (pupil-to-pupil, mouth width, nose length, ear width, and the like), contours of facial features, pixilation corresponding to skin tone or texture, hair and/or eye color, and the like. Facial recognition programs running on the UAV 10 may perform the comparison using recognition algorithms (e.g., which can be stored as instruction in the memory in the UAV 10). The algorithms may include geometric algorithms, photometric algorithms, three-dimensional (3D) modeling and recognition techniques, principal component analysis using eigenfaces (eigenvectors related to facial recognition, e.g., derived from the covariance matrix of the probability distribution over the high-dimensional vector space of face images), linear discriminate analysis, pattern matching, and the like.

Based on comparison-based values, such as preprogrammed acceptable margins of error, facial recognition programs running on the UAV 10, the controller 20 of the UAV 10 may determine whether or not the authentication image and the stored image are sufficiently similar to one another for facial recognition. In instances where the facial recognition programs grant a match, the UAV 10 will release the medication package 18. If the facial recognition programs deny a match, the UAV 10 will not release the medication package 10 at the current location of the UAV 10. When facial recognition fails, the UAV 10 may trigger a different type of authentication, (e.g., a code or an image sent to a user device registered to the recipient's account with the pharmacy). The UAV 10 may read the code or the image displayed on the user device and if a match is determined then the UAV 10 will release the medication package 18. The alternate authentication of the recipient or the delivery location may be needed when the person being authenticated is ill and shows facial symptoms (e.g., red eyes, swollen glands, water retention, chapped lips, chapped nose, runny nose, watery eyes, hair loss etc.). These symptomatic feature changes may cause the recipient to fail a facial recognition.

A further alternate authentication may include the UAV 10 reading a label of the previously filled prescription at the delivery location. The recipient may hold up the prior medication container and the UAV 10 may read the label (e.g., prescription number, patient name, filling pharmacy, refills left, name of drug, dosage, machine readable code and other label data). When the recipient is not at the delivery location, the prior medication container may be left at the location and read by the UAV 10. The prior medication container may provide the authentication data for the UAV 10 to authenticate the delivery location and release the medication package 10.

In some embodiments, the UAV 10 may receive instructions to retrieve the mediation package 18 from the starting location. The instructions may include the authentication data corresponding to a delivery person at an intermediate delivery location and/or authentication data corresponding to the intermediate delivery location. The intermediate delivery location may include a location corresponding to a delivery service within a range of the authenticated delivery location. The delivery service may receive instructions to deliver the medication package 18 to the recipient.

Before the UAV 10 releases the medication package 18 to the delivery person, the UAV 10 may authenticate the identity of the delivery person. For example, the UAV 10 may travel with the medication package 18 to the intermediate delivery location. The UAV 10 may use the authentication data to authenticate the delivery person (e.g., using facial recognition, fingerprint scans, retina scans, QR codes, numerical values, any other suitable information, or a combination thereof). Additionally, or alternatively, the UAV 10 may authenticate the intermediate delivery location using the authentication data (e.g., using GPS coordinates, an address, images of the intermediate delivery location captured by the UAV 10 and/or stored in the authentication data, other suitable information, or a combination thereof). If the UAV 10 authenticates the delivery person and/or the intermediate delivery location, the UAV 10 may release the medication package 18 to the delivery person and/or deposit the medication package 18 at an authorize deposit location at the intermediate delivery location.

In some embodiments, the UAV 10 may communicate a notification indicating that the medication package 18 has been delivered to the intermediate delivery location. For example, the UAV 10 may communicate the notification to the hub station 210, as described. The computing device 100 at the hub station 210 may provide the notification to the recipient via the pharmacy application (e.g., on the mobile computing device 202), a text message, an SMS message, a phone call, an email or other suitable notification mechanism. Additionally, or alternatively, the UAV 10 may communicate the notification directly to the recipient via the pharmacy application (e.g., on the mobile computing device 202), a text message, an SMS message, a phone call, an email or other suitable notification mechanism.

The notification may indicate an estimated delivery time of the medication package 18 to the authenticated delivery location. In some embodiments, the recipient may use the pharmacy application (e.g., or a text message, or other suitable mechanism) to reschedule delivery of the medication package 18. The hub station 210 may receive a rescheduling notification. The hub station 210 may communicate with the intermediate delivery location to reschedule delivery of the mediation package 18. In some embodiments, if the reschedule notification is received outside of normal business hours, he hub station 210 may instruct the UAV 10 to retrieve the medication package from the intermediate delivery location and return the medication package 18 to a secure location, as described (e.g., the hub station 210, the pharmacy, or other secure location).

In some embodiments, the delivery person delivers the mediation package 18 to recipient at authenticated delivery location. The delivery person may authenticate the recipient and/or the authenticated delivery location, using any suitable technique. Authentication data corresponding to the recipient and/or the authenticated delivery location may be stored on a delivery device of the delivery person. For example, the UAV 10 may transmit or communicate the authentication data to the delivery device when the UAV 10 delivers the medication package 18 to the delivery person and/or the intermediate delivery location. Additionally, or alternatively, the delivery device may receive the authentication data from the pharmacy, the hub station 210, or any other suitable source. The delivery device may communicate data corresponding to authentication of the recipient at the authenticated delivery location to the UAV 10, the hub station 210, the pharmacy, or any suitable location.

Figure 10:
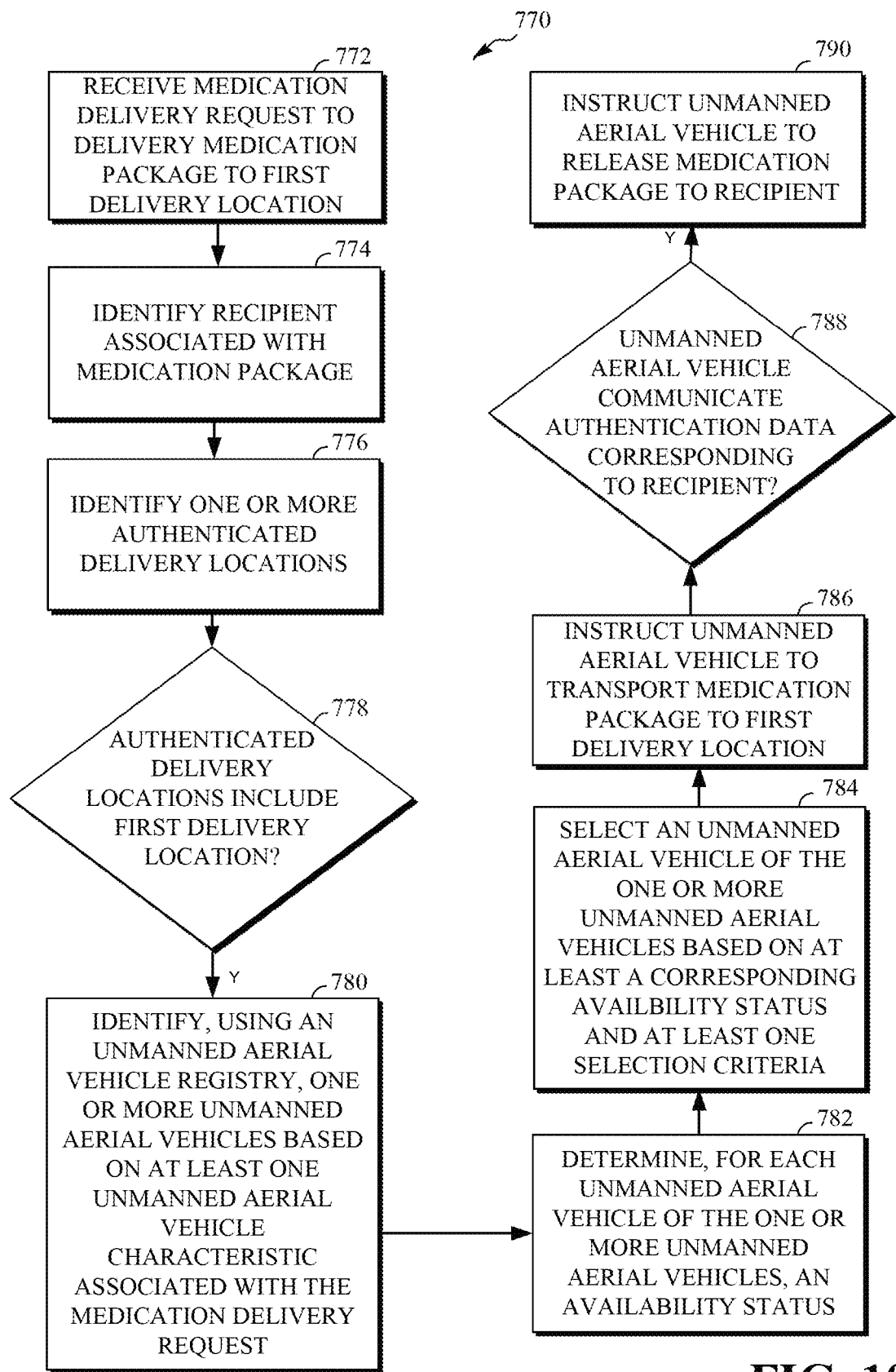
FIG. 10 is a flow diagram generally illustrating an alternative secure medication package delivery method according to the principles of the present disclosure.

FIG. 10 is a flow diagram generally illustrating an alternative secure medication package delivery method 770 according to the principles of the present disclosure. At 772, the method 770 receives a medication request to deliver a medication package to a first delivery location. For example, the computing device 100 receives the medication delivery request from the pharmacy or other suitable location to deliver the medication package 18.

At 774, the method 770 identifies a recipient associated with the medication package. For example, the computing device 100 identifies the recipient of the medication package 18, as described.

At 776, the method 770 identifies one or more authenticated delivery locations. For example, the computing device 100 may access the authenticated delivery locations database. The computing device 100 may identify one or more authenticated delivery locations corresponding to the recipient using the authenticated delivery locations database.

At 778, the method 770 determines whether the authenticated delivery locations include the first delivery location. For example, the computing device 100 determines whether the one or more authenticated delivery locations includes the first delivery location. If the computing device 100 determines that the one or more authenticated delivery locations includes the first delivery location, the method 770 continues at 780. If the computing device 100 determines the one or more authenticated delivery locations does not include the first delivery location, the method 770 may end or may provide instructions to the recipient, via the pharmacy application, as described.

At 780, the method 770 identifies, using an unmanned aerial vehicle registry, one or more unmanned aerial vehicles based on at least one unmanned aerial vehicle characteristic associated with the medication delivery request. For example, the computing device 100 may identify one or more UAVs of the UAV registry, based on at least one UAV characteristic associated with the medication delivery request.

At 782, the method 770 determines, for each unmanned aerial vehicle of the one or more unmanned aerial vehicles, an availability status. For example, the computing device 100 may determine, for each UAV of the one or more UAVs, an availability status.

At 784, the method 770 may select an unmanned aerial vehicle of the one or more unmanned aerial vehicles based on at least a corresponding availability status and at least one selection criteria. For example, the computing device 100 may select a UAV, such as the UAV 10, of the one or more unmanned aerial vehicles based on at least a corresponding availability status and at least one selection criteria.

At 786, the method 770 instructs an unmanned aerial vehicle to transport the medication package to the first delivery location. For example, the computing device 100 instructs the UAV 10 to transport the medication package 18 to the first delivery location.

At 788, the method 770 determines whether the unmanned aerial vehicle communicate authentication data corresponding to the recipient. For example, the computing device 100 determines whether the UAV 10 communicated the authentication data and that, the authentication data corresponds to the recipient. If the computing device 100 determines that the UAV 10 communicated the authentication data and that the authentication data corresponds to the recipient, the method 770 continues at 790. If the computing device 100 determines that the UAV 10 did not communicate the authentication data and/or that the authentication data does not correspond to the recipient, the method 770 may end or may instruct the UAV 10 to return the medication package 18 to the hub station 210 or a secure location.

At 790, the method 770 instructs the unmanned aerial vehicle to release the medication package to the recipient. For example, the computing device 100 instructs the UAV 10 to release the medication package 18 to the recipient.

Figure 11:
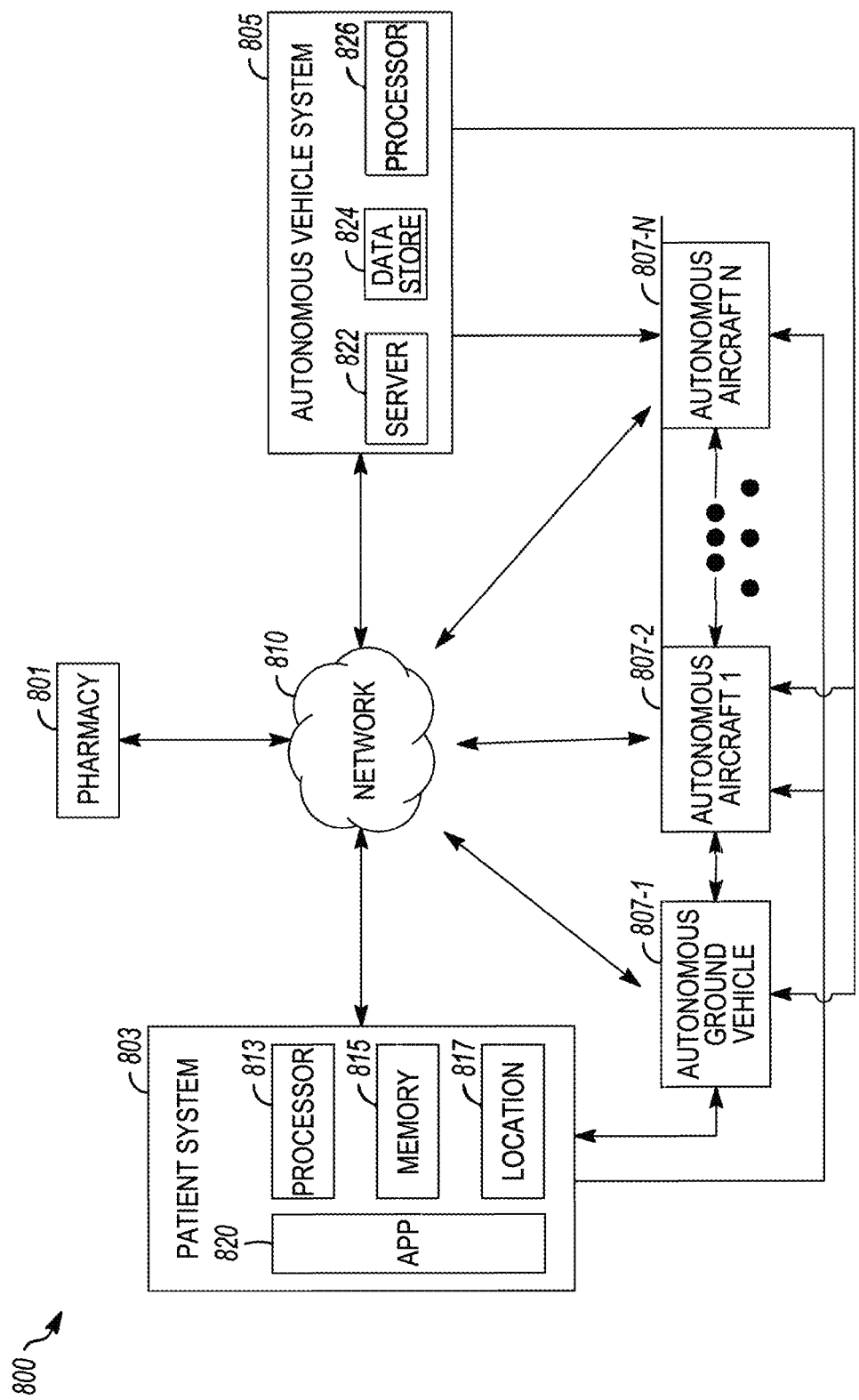
FIG. 11 generally illustrates a schematic view of system according to the principles of the present disclosure.

FIG. 11 generally illustrates a schematic view of a system 800 according to the principles of the present disclosure. The system 800 includes a pharmacy 801, a patient system 803, an autonomous vehicle system 805, and a plurality of autonomous vehicles 807-1, 807-2 . . . 807-N, which may be connected over a communications network 810, e.g., a global computer system such as the Internet, or a mobile communication system.

The pharmacy 801 may include a plurality of systems to receive, adjudicate, approve, schedule, and fill a prescription order. The pharmacy 801 may include a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use a device to submit the claim to a pharmacy benefits management system for adjudication. For example, this may allow the sharing of member information such as drug history that may allow the pharmacy to better service a member (for example, by providing more informed therapy consultation and drug interaction information).

In some embodiments, a benefit manager device may track prescription drug fulfillment and/or other information for users that are not members, or have not identified themselves as members, at the time (or in conjunction with the time) in which they seek to have a prescription filled at a pharmacy. The pharmacy 801 may include a pharmacy fulfillment device, an order processing device, and a pharmacy management device in communication with each other directly and/or over a network. The order processing device may receive information regarding filling prescriptions and may direct an order component to one or more devices of the pharmacy fulfillment device at a pharmacy. The pharmacy fulfillment device may fulfill, dispense, aggregate, and/or pack the order components of the prescription drugs in accordance with one or more prescription orders directed by the order processing device. The pharmacy fulfillment device may include automated systems to fill a prescription or fill environmentally controlled drugs as part of a medicine order.

The medicine order may include a temperature-controlled drug as described herein. The pharmacy 801 may set the thermal parameters that must be adhered to during delivery.

Accordingly, the pharmacy 801 may include one or more physical computers and data storage. The data store may store related to each individual drug that requires temperature control. An example of such a system is described in U.S. Pat. No. 8,600,903 issued to Charles Eller, filed Jun. 14, 2007, and U.S. patent application Ser. No. 14/630,373, filed Feb. 24, 2015, which are both hereby incorporated by reference for any purpose.

The pharmacy 801 packages medicine orders for delivery by one or more of the autonomous vehicles 807-1, 807-2 . . . 807-N. The pharmacy 801 may include shipping stations whereat one or more of the autonomous vehicles 807-1, 807-2 . . . 807-N, or ground shippers may pick up a packaged medical order for delivery to a patient delivery location. The pharmacy may communicate with the patient system 803, which may be an app on a computing device registered to the patient, the autonomous vehicle system 805 and each of the autonomous delivery vehicles 807-1, 807-2 . . . 807-N. The information from the pharmacy 801 about an individual package may determine if the package is delivered by a ground vehicle 807-1 or flow using an autonomous aircraft 807-2 . . . 807-N. The aircraft 807-2 . . . 807-N may include any of the components and perform the methods described herein. The aircraft may communicate with each other as a mesh network while in flight to share sensed data, e.g., environmental characteristics at the location of the aircraft.

The patient system 803 may be used to place an order for a drug package, e.g., for delivery by one or more of the autonomous vehicles 807-1, 807-2 . . . 807-N. The patient system 803 may utilize one or more computing devices 842 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 820, such as a web browser or a dedicated application, and may be connected to or otherwise communicate with the pharmacy 801 or the autonomous vehicles 807-1, 807-2 . . . 807-N through the communications network 810 using the transmission and the receipt of digital data. The patient system 803 includes a processor 813 to execute dedicated instructions that are stored in a memory 815.

The patient system 803 may include a location sensor, e.g., satellite navigation, to track the location of the patient relative to the delivery location that the vehicle 807-1, 807-2 . . . or 807-N will drop off the package. The patient system 803 may also provide local weather data, e.g., temperature and sunlight to the present system to be used in the calculation of the thermal budget of a package being carried by the vehicle 807-1, 807-2 . . . 807-N or waiting at the delivery location. The vehicles 807-1, 807-2 . . . 807-N may also communicate their location to the patient system 803 to alert the patient when the package will arrive, when the package is dropped off and the estimate of time that the present system will leave the package at the delivery location. The patient system 803, e.g., through the software application 820 and network, that the package has been picked up to the vehicles 807-1, 807-2 . . . 807-N, the vehicle system 805 and/or to the pharmacy 801.

The autonomous vehicles 807-1, 807-2 . . . 807-N may be any type or form of self-powered vehicle capable of being programmed or otherwise configured for autonomous travel to deliver packages, e.g., medical packages with medicines in need of controlled environments as described herein. Each of the autonomous vehicles may include one or more electrical components described herein, e.g., at least one processor, a memory, sensors, and communications devices to communicate with each other and through the network 810. For example, the autonomous aircraft may receive instructions or other information or data via the communications device for its flight path, delivery location, and sensing of the environment over the path over the network. In an example, the network 810 and vehicles communicate wirelessly, e.g., over mobile protocols or standard wireless protocols such as Bluetooth® or any Wireless Fidelity (or "Wi-Fi"). The aircraft and ground vehicle may also communicate through one or more wired communications connections, e.g., Universal Serial Bus (or "USB") or fiber optic cable.

The autonomous vehicle system 805 may include a server to provide delivery paths and locations to the vehicles for delivery of packages. The autonomous vehicle system 805 may include a memory to store the maps, weather, at least one environment characteristic, vehicle data (e.g., distance capability, battery charge, payload capacity, computed thermal budget for each package and the like) to be used by the server 822 or a processor 826. The server 822 may also receive updated data from the patient system 803 or the vehicles 807-1, 807-2 . . . 807-N. This data may be used to calculate updated instructions for the vehicles or to trigger the instructions described herein.

The processors of the UAV 10 or autonomous vehicle system 805 may include circuitry to perform delivery confirmation operations before releasing a package. For audio confirmation, the authorized receiver of the package records a message that can be stored in the memory of the hub station. The hub station (or other server in communication with the UAV) can download the digitized audio file associated with the components of an order in the package to be delivered in by the UAV. The UAV circuitry can operate a microphone at the delivery location to sample the voice of the person at the delivery location. The UAV circuitry, e.g., a digital signal processor, compares the sampled audio signal to the saved audio signal. If there is a match, the UAV circuitry will generate a match signal to release the package. If there is not a match, the IAV will not release the package. A similar operation can be used for other biometrics with the release biometrics being loaded in the memory of the UAV and the UAV circuitry performs a matching operation of data generated at the delivery location with the stored biometric data.

Figure 12:
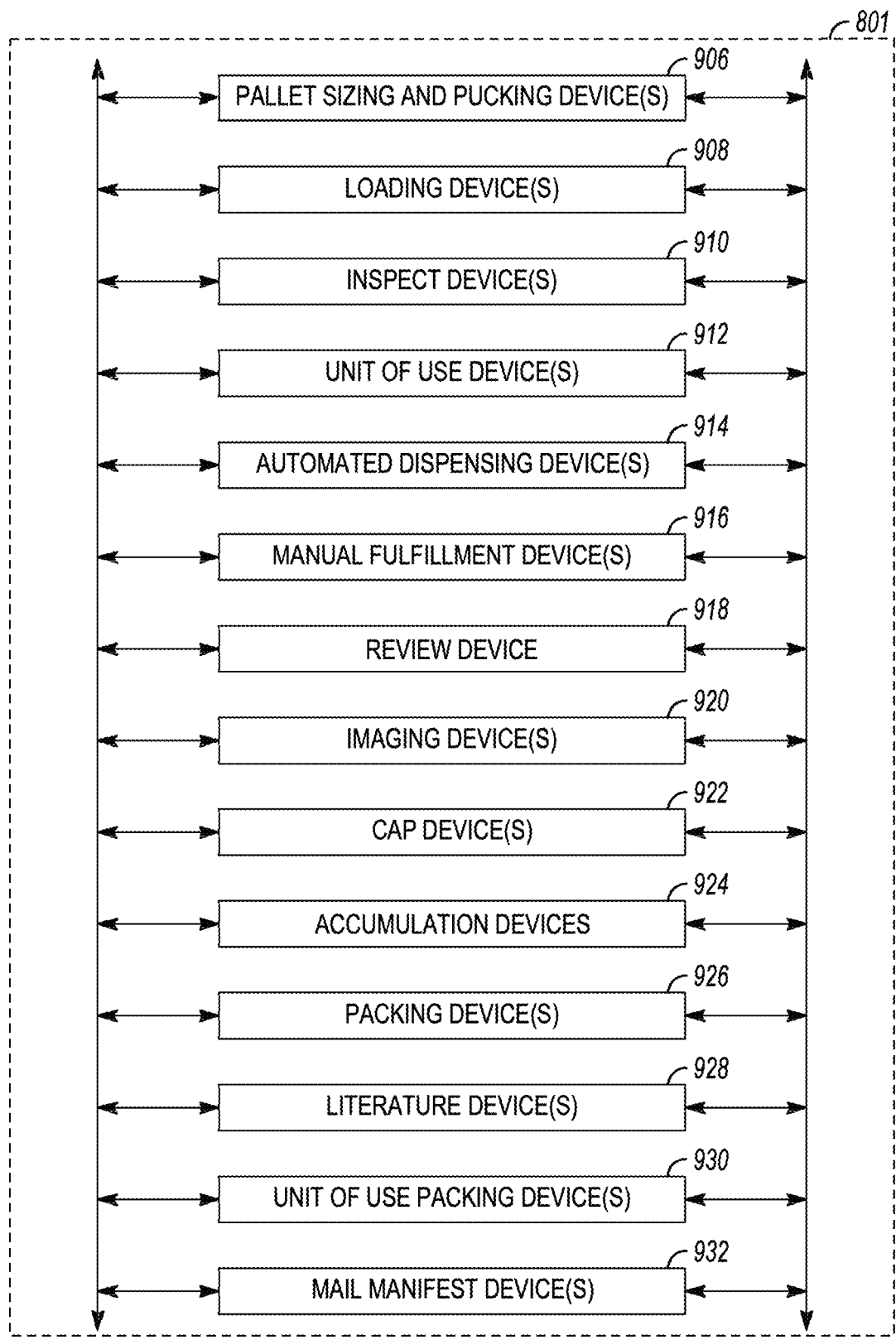
FIG. 12 generally illustrates a pharmacy according to the principles of the present disclosure.

FIG. 12 generally illustrates the pharmacy 801 according to the principles of the present disclosure. The pharmacy 801 may be used to process and fulfill prescriptions and prescription orders. After fulfillment, the fulfilled prescriptions are packed for shipping.

The pharmacy 801 may include devices in communication with a benefit manager device, an order processing device, and/or the storage device, directly or over the network. Specifically, the pharmacy 801 may include pallet sizing and pucking device(s) 906, loading device(s) 908, inspect device(s) 910, unit of use device(s) 912, automated dispensing device(s) 914, manual fulfillment device(s) 916 (which may be fulfill environmentally controlled drugs), review devices 918, imaging device(s) 920, cap device(s) 922, accumulation devices 924, packing device(s) 926, literature device(s) 928, unit of use packing device(s) 930 (which may be pack environmentally controlled drugs), and mail manifest device(s) 232. Further, the pharmacy 801 may include additional devices, which may communicate with each other directly or over the network.

In some embodiments, operations performed by one of these devices 906-932 may be performed sequentially, or in parallel with the operations of another device as may be coordinated by the order processing device, which may include a dedicated processor in operable communication with a memory. In some embodiments, the order-processing device tracks a prescription with the pharmacy based on operations performed by one or more of the devices 906-932.

In some embodiments, the pharmacy may transport prescription drug containers, for example, among the devices 906-932 in the high-volume fulfillment center, by use of pallets. The pallet sizing and pucking device 906 may configure pucks in a pallet. A pallet may be a transport structure for a number of prescription containers, and may include a number of cavities. A puck may be placed in one or more than one of the cavities in a pallet by the pallet sizing and pucking device 906. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device based on prescriptions that the order processing device decides to launch. The arrangement logic may be implemented directly in the pallet sizing and pucking device 906. Once a prescription is set to be launched, a puck suitable for the appropriate size of container for that prescription may be positioned in a pallet by a robotic arm or pickers. The pallet sizing and pucking device 906 may launch a pallet once pucks have been configured in the pallet.

The loading device 908 may load prescription containers into the pucks on a pallet by a robotic arm, a pick and place mechanism (also referred to as pickers), etc. In various embodiments, the loading device 908 has robotic arms or pickers to grasp a prescription container and move it to and from a pallet or a puck. The loading device 908 may also print a label that is appropriate for a container that is to be loaded onto the pallet, and apply the label to the container. The pallet may be located on a conveyor assembly during these operations (e.g., at the high-volume fulfillment center, etc.).

The inspect device 910 may verify that containers in a pallet are correctly labeled and in the correct spot on the pallet. The inspect device 910 may scan the label on one or more containers on the pallet. Labels of containers may be scanned or imaged in full or in part by the inspect device 910. Such imaging may occur after the container has been lifted out of corresponding puck by a robotic arm, picker, etc., or may be otherwise scanned or imaged while retained in the puck. In some embodiments, images and/or video captured by the inspect device 910 may be stored in the storage device as order data.

The unit of use device 912 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, temperature-controlled drugs, etc. Prescription drug products dispensed by the unit of use device 912 may be packaged individually or collectively for shipping, or may be shipped in combination with other prescription drugs dispensed by other devices in the high-volume fulfillment center.

At least some of the operations of the devices 906-932 may be directed by the order processing device. For example, the manual fulfillment device 916, the review device 918, the automated dispensing device 914, and/or the packing device 926, etc. may receive instructions provided by the order processing device.

The automated dispensing device 914 may include one or more devices that dispense prescription drugs or pharmaceuticals into prescription containers in accordance with one or multiple prescription orders. In general, the automated dispensing device 914 may include mechanical and electronic components with, in some embodiments, software and/or logic to facilitate pharmaceutical dispensing that would otherwise be performed in a manual fashion by a pharmacist and/or pharmacist technician. For example, the automated dispensing device 914 may include high-volume fillers that fill a number of prescription drug types at a rapid rate and blister pack machines that dispense and pack drugs into a blister pack. Prescription drugs dispensed by the automated dispensing devices 914 may be packaged individually or collectively for shipping, or may be shipped in combination with other prescription drugs dispensed by other devices in the high-volume fulfillment center.

The manual fulfillment device 916 controls how prescriptions are manually fulfilled. For example, the manual fulfillment device 916 may receive or obtain a container and enable fulfillment of the container by a pharmacist or pharmacy technician. In some embodiments, the manual fulfillment device 916 provides the filled container to another device in the pharmacy fulfillment devices to be joined with other containers in a prescription order for a user or member. For example, non-environmentally controlled drugs and environmentally controlled drugs may be filled and joined together for packaging.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. or retrieve drugs from a cooler. Some portions of the manual fulfillment process may be automated by use of a machine. For example, counting of capsules, tablets, or pills may be at least partially automated (such as through use of a pill counter). Prescription drugs dispensed by the manual fulfillment device 916 may be packaged individually or collectively for shipping, or may be shipped in combination with other prescription drugs dispensed by other devices in the high-volume fulfillment center.

The review device 918 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 918 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review may be performed at a manual review station.

The imaging device 920 may image containers once they have been filled with pharmaceuticals. The imaging device 920 may measure a fill height of the pharmaceuticals in the container based on the obtained image to determine if the container is filled to the correct height given the type of pharmaceutical and the number of pills in the prescription.

Images of the pills in the container may also be obtained to detect the size of the pills themselves and markings thereon. A temperature-controlled package may be imaged to ensure the correct coolant is in the package. The images may be transmitted to the order processing device and/or stored in the storage device as part of the order data.

The cap device 922 may be used to cap or otherwise seal a prescription container. In some embodiments, the cap device 922 may secure a prescription container with a type of cap in accordance with a user preference (e.g., a preference regarding child resistance, etc.), a plan sponsor preference, a prescriber preference, etc. The cap device 922 may also etch a message into the cap, although this process may be performed by a subsequent device in the high-volume fulfillment center.

The accumulation device 924 accumulates various containers of prescription drugs in a prescription order. The accumulation device 924 may accumulate prescription containers from various devices or areas of the pharmacy. For example, the accumulation device 924 may accumulate prescription containers from the unit of use device 912, the automated dispensing device 914, the manual fulfillment device 916, and the review device 918. The accumulation device 924 may be used to group the prescription containers prior to shipment to the member.

The literature device 928 prints, or otherwise generates, literature to include with each prescription drug order. The literature may be printed on multiple sheets of substrates, such as paper, coated paper, printable polymers, or combinations of the above substrates. The literature printed by the literature device 928 may include information required to accompany the prescription drugs included in a prescription order, other information related to prescription drugs in the order, financial information associated with the order (for example, an invoice or an account statement), etc.

In some embodiments, the literature device 928 folds or otherwise prepares the literature for inclusion with a prescription drug order (e.g., in a shipping container). In other embodiments, the literature device 928 prints the literature and is separate from another device that prepares the printed literature for inclusion with a prescription order.

The packing device 926 packages the prescription order in preparation for shipping the order. The packing device 926 may box, bag, or otherwise package the fulfilled prescription order for delivery. The packing device 926 may further place inserts (e.g., literature or other papers, etc.) into the packaging received from the literature device 928. For example, bulk prescription orders may be shipped in a box, while other prescription orders may be shipped in a bag, which may be a wrap seal bag.

The packing device 926 may label the box or bag with an address and a recipient's name. The label may be printed and affixed to the bag or box, be printed directly onto the bag or box, or otherwise associated with the bag or box. The packing device 926 may sort the box or bag for mailing in an efficient manner (e.g., sort by delivery address, etc.). The packing device 926 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise to a delivery location. Some packages will be delivered using autonomous delivery vehicles, e.g., ground vehicles or aircraft, to the delivery location.

The unit of use packing device 930 packages a unit of use prescription order in preparation for shipping the order. The unit of use packing device 930 may include manual scanning of containers to be bagged for shipping to verify each container in the order. In an example implementation, the manual scanning may be performed at a manual scanning station. A mail manifest device 232 may print mailing labels used by the packing device 926 and may print shipping manifests and packing lists. Some unit of use order packages will be delivered using autonomous delivery vehicles, e.g., ground vehicles, aircraft UAVs and the like, to the delivery location.

Multiple devices may share processing and/or memory resources. The devices 906-932 may be located in the same area or in different locations. For example, the devices 906-932 may be located in a building or set of adjoining buildings. The devices 906-932 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

In some embodiments, a method for controlling secure delivery of a medication package includes receiving a medication delivery request to deliver a medication package to a first delivery location. The method also includes identifying a recipient associated with the medication delivery request and identifying one or more authenticated delivery locations corresponding to the recipient. The method also includes determining whether the one or more authenticated delivery locations includes the first delivery location and, in response to a determination that the one or more authenticated delivery locations includes the first delivery location, instructing an unmanned aerial vehicle to transport the medication package from a starting location to the first delivery location. The method also includes, in response to the unmanned aerial vehicle communicating authentication data, determining whether the authentication data corresponds to the recipient. The method also includes, in response to a determination that the authentication data corresponds to the recipient, instructing the unmanned aerial vehicle to release the medication package to the recipient.

In some embodiments, the authentication data includes at least one of biometric data, quick response code data, and barcode data. In some embodiments, the method also includes, in response to a determination that the unmanned aerial vehicle did not communicate authentication data, determining whether the first delivery location includes an authorized deposit location. The method also includes, in response to a determination that the first delivery location includes an authorized deposit location, instructing the unmanned aerial vehicle to deposit the medication package at the authorized deposit location.

In some embodiments, the method also includes, in response to a determination that the first delivery location does not include an authorized deposit location, instructing the unmanned aerial vehicle to identify a secure location at the first delivery location and instructing the unmanned aerial vehicle to wait a first predetermined period at the secure location. In some embodiments, the method also includes receiving a time extension request from the recipient and instructing the unmanned aerial vehicle to wait a second predetermined period at the secure location. In some embodiments, the method also includes, in response to a determination that the first delivery location does not include an authorized deposit location, instructing the unmanned aerial vehicle to return the medication package to the starting location.

In some embodiments, the method also includes, in response to a receiving a reroute request from the recipient indicating a second delivery location, determining whether the one or more authenticated delivery locations includes the second delivery location and in response to a determination that the one or more authenticated delivery locations includes the second delivery location, instructing the unmanned aerial vehicle to one of transport the medication package to the second delivery location and transport the medication package to the starting location.

In some embodiments, the method also includes, in response to a receiving a reroute request from the recipient indicating a dynamic delivery location, identifying location information corresponding to a mobile computing device associated with the recipient and instructing the unmanned aerial vehicle to transport the medication package to an identified location of the recipient, the identified location being identified based on the location information.

In some embodiments, the method also includes, in response to a determination that the unmanned aerial vehicle communicated authentication data corresponding to the recipient, instructing the unmanned aerial vehicle to release the medication package to the recipient at the identified location of the recipient and in response to a determination that the unmanned aerial vehicle did not communicate authentication data corresponding to the recipient, instructing the unmanned aerial vehicle to one of transport the medication package to a secure location and transport the medication package to the starting location.

In some embodiments, an apparatus for controlling secure delivery of a medication package includes a processor and a memory. The memory includes instructions that, when executed by the processor, cause the processor to: receive a medication delivery request to deliver a medication package to a first delivery location; identify a recipient associated with the medication delivery request; identify one or more authenticated delivery locations corresponding to the recipient; determine whether the one or more authenticated delivery locations includes the first delivery location; in response to a determination that the one or more authenticated delivery locations includes the first delivery location, instruct an unmanned aerial vehicle to transport the medication package from a starting location to the first delivery location; in response to the unmanned aerial vehicle communicating authentication data, determine whether the authentication data corresponds to the recipient; and, in response to a determination that the authentication data corresponds to the recipient, instruct the unmanned aerial vehicle to release the medication package to the recipient.

In some embodiments, the authentication data includes at least one of biometric data, quick response code data, and barcode data. In some embodiments, the instructions further cause the processor to, in response to a determination that the unmanned aerial vehicle did not communicate authentication data, determine whether the first delivery location includes an authorized deposit location and in response to a determination that the first delivery location includes an authorized deposit location, instruct the unmanned aerial vehicle to deposit the medication package at the authorized deposit location.

In some embodiments, the instructions further cause the processor circuitry to, in response to a determination that the first delivery location does not include an authorized deposit location, instruct the unmanned aerial vehicle to identify a secure location at the first delivery location and instruct the unmanned aerial vehicle to wait a first predetermined period at the secure location. In some embodiments, the instructions further cause the processor circuitry to receive a time extension request from the recipient and instruct the unmanned aerial vehicle to wait a second predetermined period at the secure location.

In some embodiments, the instructions further cause the processor circuitry to, in response to a determination that the first delivery location does not include an authorized deposit location, instruct the unmanned aerial vehicle to return the medication package to the starting location. In some embodiments, the instructions further cause the processor circuitry to, in response to a receiving a reroute request from the recipient indicating a second delivery location, determine whether the one or more authenticated delivery locations includes the second delivery location and, in response to a determination that the one or more authenticated delivery locations includes the second delivery location, instruct the unmanned aerial vehicle to one of transport the medication package to the second delivery location and transport the medication package to the starting location.

In some embodiments, the instructions further cause the processor circuitry to, in response to a receiving a reroute request from the recipient indicating a dynamic delivery location, identify location information corresponding to a mobile computing device associated with the recipient and instruct the unmanned aerial vehicle to transport the medication package to an identified location of the recipient, the identified location being identified based on the location information.

In some embodiments, the instructions further cause the processor circuitry to, in response to a determination that the unmanned aerial vehicle communicated authentication data corresponding to the recipient, instruct the unmanned aerial vehicle to release the medication package to the recipient at the identified location of the recipient and, in response to a determination that the unmanned aerial vehicle did not communicate authentication data corresponding to the recipient, instruct the unmanned aerial vehicle to one of transport the medication package to a secure location and transport the medication package to the starting location.

In some embodiments, an apparatus for controlling secure delivery of a medication package includes a processor and a memory. The memory includes instructions that, when executed by the processor, cause the processor to: receive a request to deliver a medication package to a first delivery location; determine whether one or more authenticated delivery locations associated with a recipient of the medication package includes the first delivery location; in response to a determination that the one or more authenticated delivery locations includes the first delivery location, identify, based on global position coordinates of the first delivery location, a first unmanned aerial vehicle of a plurality of unmanned aerial vehicles communicatively connected via a mesh network; instruct the first unmanned aerial vehicle to transport the medication package from a starting location to the first delivery location; in response to receiving authentication data from a second unmanned aerial vehicle of the plurality of unmanned aerial vehicles, determine whether the authentication data corresponds to the recipient, wherein the first unmanned aerial vehicle captures the authentication data and communicates the authentication data to the second unmanned aerial vehicle via the mesh network; and in response to a determination that the authentication data corresponds to the recipient, communicate to one of the second unmanned aerial vehicle and a third unmanned aerial vehicle of the plurality of unmanned aerial vehicles, an instruction for the first unmanned aerial vehicle to release the medication package to the recipient, wherein the first unmanned aerial vehicle receives, via the mesh network, the instruction from the one of the second unmanned aerial vehicle, the third unmanned aerial vehicle, and another unmanned aerial vehicle of the plurality of unmanned aerial vehicles.

In some embodiments, the authentication data includes at least one of biometric data, quick response code data, and barcode data.

In some embodiments, a method for controlling secure delivery of a medication package includes receiving a medication delivery request to deliver a medication package to a first delivery location, identifying a recipient associated with the medication delivery request, and identifying one or more authenticated delivery locations corresponding to the recipient. The method also includes determining whether the one or more authenticated delivery locations includes the first delivery location and, in response to a determination that the one or more authenticated delivery locations includes the first delivery location, identifying, using an unmanned aerial vehicle registry, one or more unmanned aerial vehicles based on at least one unmanned aerial vehicle characteristic associated with the medication delivery request. The method also includes determining, for each unmanned aerial vehicle of the one or more unmanned aerial vehicles, an availability status, selecting an unmanned aerial vehicle of the one or more unmanned aerial vehicles based on at least a corresponding availability status and at least one selection criteria, and instructing the unmanned aerial vehicle to transport the medication package from a starting location to the first delivery location. The method also includes, in response to the unmanned aerial vehicle communicating authentication data, determining whether the authentication data corresponds to the recipient and, in response to a determination that the authentication data corresponds to the recipient, instructing the unmanned aerial vehicle to release the medication package to the recipient.

In some embodiments, the method also includes, in response to a determination that the unmanned aerial vehicle did not communicate authentication data, determining whether the first delivery location includes an authorized deposit location and, in response to a determination that the first delivery location includes an authorized deposit location, instructing the unmanned aerial vehicle to deposit the medication package at the authorized deposit location. In some embodiments, the method also includes, in response to a determination that the first delivery location does not include an authorized deposit location, instructing the unmanned aerial vehicle to identify a secure location at the first delivery location and instructing the unmanned aerial vehicle to wait a first predetermined period at the secure location. In some embodiments, the method also includes receiving a time extension request from the recipient and instructing the unmanned aerial vehicle to wait a second predetermined period at the secure location. In some embodiments, the authentication data includes at least one of biometric data, quick response code data, and barcode data. In some embodiments, the biometric data includes at least one of fingerprint data of the recipient, facial recognition data of the recipient, and retina scan data of the recipient. In some embodiments, the method also includes, in response to a receiving a reroute request from the recipient indicating a second delivery location, determining whether the one or more authenticated delivery locations includes the second delivery location and, in response to a determination that the one or more authenticated delivery locations includes the second delivery location, instructing the unmanned aerial vehicle to one of transport the medication package to the second delivery location and transfer the medication package to another unmanned aerial vehicle based on at least a state of charge of a battery of the unmanned aerial vehicle. In some embodiments, the method also includes, in response to a receiving a reroute request from the recipient indicating a dynamic delivery location: identifying location information corresponding to a mobile computing device associated with the recipient; and instructing the unmanned aerial vehicle to transport the medication package to an identified location of the recipient, the identified location being identified based on the location information. In some embodiments, the at least one unmanned aerial vehicle characteristic includes at least one of an unmanned aerial vehicle range, an unmanned aerial vehicle speed, an unmanned aerial vehicle payload capacity, an unmanned aerial vehicle security feature, and an unmanned aerial vehicle temperature control feature.

In some embodiments, a system for controlling secure delivery of a medication package includes a processor and a memory. The memory includes instructions that, when executed by the processor, cause the processor to: receive a medication delivery request to deliver a medication package to a first delivery location; identify a recipient associated with the medication delivery request; identify one or more authenticated delivery locations corresponding to the recipient; determine whether the one or more authenticated delivery locations includes the first delivery location; in response to a determination that the one or more authenticated delivery locations includes the first delivery location, identify, using an unmanned aerial vehicle registry, one or more unmanned aerial vehicles based on at least one unmanned aerial vehicle characteristic associated with the medication delivery request; determine, for each unmanned aerial vehicle of the one or more unmanned aerial vehicles, an availability status; select an unmanned aerial vehicle of the one or more unmanned aerial vehicles based on at least a corresponding availability status and at least one selection criteria; instruct the unmanned aerial vehicle to transport the medication package from a starting location to the first delivery location; and, in response to the unmanned aerial vehicle communicating authentication data: determine whether the authentication data corresponds to the recipient; and, in response to a determination that the authentication data corresponds to the recipient, instruct the unmanned aerial vehicle to release the medication package to the recipient.

In some embodiments, the instructions further cause the processor to, in response to a determination that the unmanned aerial vehicle did not communicate authentication data, determine whether the first delivery location includes an authorized deposit location and, in response to a determination that the first delivery location includes an authorized deposit location, instruct the unmanned aerial vehicle to deposit the medication package at the authorized deposit location. In some embodiments, the instructions further cause the processor to, in response to a determination that the first delivery location does not include an authorized deposit location, instruct the unmanned aerial vehicle to identify a secure location at the first delivery location and instruct the unmanned aerial vehicle to wait a first predetermined period at the secure location. In some embodiments, the instructions further cause the processor to receive a time extension request from the recipient and instruct the unmanned aerial vehicle to wait a second predetermined period at the secure location. In some embodiments, the authentication data includes at least one of biometric data, quick response code data, and barcode data. In some embodiments, the biometric data includes at least one of fingerprint data of the recipient, facial recognition data of the recipient, and retina scan data of the recipient. In some embodiments, the instructions further cause the processor to, in response to a receiving a reroute request from the recipient indicating a second delivery location, determine whether the one or more authenticated delivery locations includes the second delivery location, and, in response to a determination that the one or more authenticated delivery locations includes the second delivery location, instruct the unmanned aerial vehicle to one of transport the medication package to the second delivery location and transfer the medication package to another unmanned aerial vehicle based on at least a state of charge of a battery of the unmanned aerial vehicle. In some embodiments, the instructions further cause the processor to, in response to a receiving a reroute request from the recipient indicating a dynamic delivery location, identify location information corresponding to a mobile computing device associated with the recipient, and instruct the unmanned aerial vehicle to transport the medication package to an identified location of the recipient, the identified location being identified based on the location information. In some embodiments, the at least one unmanned aerial vehicle characteristic includes at least one of an unmanned aerial vehicle range, an unmanned aerial vehicle speed, an unmanned aerial vehicle payload capacity, an unmanned aerial vehicle security feature, and an unmanned aerial vehicle temperature control feature.

In some embodiments an apparatus for controlling secure delivery of a medication package includes a processor and a memory. The memory includes instructions that, when executed by the processor, cause the processor to: receive a medication delivery request to deliver a medication package to a first delivery location; identify, using an unmanned aerial vehicle registry, one or more unmanned aerial vehicles based on at least one unmanned aerial vehicle characteristic associated with the medication delivery request; determine, for each unmanned aerial vehicle of the one or more unmanned aerial vehicles, an availability status; select an unmanned aerial vehicle of the one or more unmanned aerial vehicles based on at least a corresponding availability status; instruct the unmanned aerial vehicle to transport the medication package from a starting location to the first delivery location; and, in response to the unmanned aerial vehicle communicating authentication data: determine whether the authentication data corresponds to a recipient associated with the medication delivery request; and, in response to a determination that the authentication data corresponds to the recipient, instruct the unmanned aerial vehicle to release the medication package to the recipient.

In some embodiments, the authentication data includes at least one of biometric data, quick response code data, and barcode data.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a special purpose computer/processor may be utilized which may contain hardware for carrying out any of the methods, algorithms, or instructions described herein. The hardware may become a special purpose device when storing instructions, loading instructions, or executing instructions for the methods and/or algorithms described herein.

Further, all or a portion of implementations of the present disclosure may take the form of a computer program product accessible from, for example, a computer-usable or computer-readable medium. The program includes steps to perform, at least, portions of the methods described herein. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A package delivery method, comprising:
   delivering a package to a first location with an unmanned aerial vehicle;
   sensing authentication data at the first location with the unmanned aerial vehicle;
   determining, using a facial recognition program, whether the authentication data corresponds to the recipient, wherein the facial recognition program compares at least one metric associated with the at least one authentication image with at least one metric associated with at least one stored image corresponding to the recipient;
   in response to a determination, by the facial recognition program, that the authentication data corresponds to the recipient, instructing the unmanned aerial vehicle to release the package to the recipient;
   in response to a determination that the unmanned aerial vehicle did not communicate authentication data and in response to a determination that the first location does not include an authorized deposit location:
   instructing the unmanned aerial vehicle to identify a secure location at the first location;
   instructing the unmanned aerial vehicle to wait a first period at the secure location; and
   in response to receiving, prior to an expiration of the first period, a time extension request from the recipient, instructing the unmanned aerial vehicle to wait a second period at the secure location.

2. The method of claim 1, further comprising depositing the package upon determining valid authentication data and facial recognition during either the first period or the second period.

3. The method of claim 2, wherein the authentication data further includes biometric data of the recipient.

4. The method of claim 3, wherein the biometric data includes at least one of fingerprint data of the recipient, voice matching of the recipient, retina scan data of the recipient, or combinations thereof.

5. The method of claim 1, wherein upon expiration of the second time period rerouting the unmanned aerial vehicle to a second delivery location.

6. The method of claim 5, wherein rerouting includes electronically receiving a request from a recipient device requesting delivery at the second delivery location.

7. The method of claim 5, wherein rerouting includes determining a state of charge of a battery of the unmanned aerial vehicle and calculating whether the unmanned aerial vehicle can the package to the second delivery location and return to an unmanned aerial vehicle home location.

8. A package delivery method, comprising:
   delivering a package to a first location with a first unmanned aerial vehicle;
   sensing authentication data at the first location with the first unmanned aerial vehicle;
   determining, using a facial recognition program, whether the authentication data corresponds to the recipient, wherein the facial recognition program compares at least one metric associated with the at least one authentication image with at least one metric associated with at least one stored image corresponding to the recipient;
   in response to a determination, by the facial recognition program, that the authentication data corresponds to the recipient, instructing the first unmanned aerial vehicle to release the package to the recipient;
   in response to a determination that the first unmanned aerial vehicle did not communicate authentication data and in response to a determination that the first location does not include an authorized deposit location:
   instructing the first unmanned aerial vehicle to identify a secure location at the first location;
   instructing the first unmanned aerial vehicle to wait a first period at the secure location;
   in response to receiving, prior to an expiration of the first period, a time extension request from the recipient, instructing the first unmanned aerial vehicle to wait a second period at the secure location;
   calculating a state of charge of the first unmanned aerial vehicle; and
   if the calculated state of charge is below a threshold, transfer the package from the first unmanned aerial vehicle to a second unmanned aerial vehicle.

9. The package delivery method of claim 8, further comprising:
   delivering the package to the first location with the second unmanned aerial vehicle;
   sensing authentication data at the first location with the second unmanned aerial vehicle;
   determining, using a facial recognition program, whether the authentication data corresponds to the recipient, wherein the facial recognition program compares at least one metric associated with the at least one authentication image with at least one metric associated with at least one stored image corresponding to the recipient; and
   in response to a determination, by the facial recognition program, that the authentication data corresponds to the recipient, instructing the second unmanned aerial vehicle to release the package to the recipient.

10. The package delivery method of claim 9, further comprising:
    in response to a determination that the second unmanned aerial vehicle did not communicate authentication data and in response to a determination that the first location does not include the authorized deposit location:
    instructing the second unmanned aerial vehicle to identify the secure location at the first location;
    instructing the second unmanned aerial vehicle to wait the first period at the secure location; and
    in response to receiving, prior to an expiration of the first period, the time extension request from the recipient, instructing the second unmanned aerial vehicle to wait the second period at the secure location.

11. The package delivery method of claim 10, further comprising depositing the package with the second unmanned aerial vehicle upon determining valid authentication data and facial recognition during either the first period or the second period.

12. The package delivery method of claim 11, wherein the authentication data further includes biometric data of the recipient sensed by the second aerial vehicle.

13. The package delivery method of claim 12, wherein the biometric data includes at least one of fingerprint data of the recipient, voice matching of the recipient, retina scan data of the recipient, or combinations thereof.

14. The package method of claim 10, wherein upon expiration of the second time period rerouting the second unmanned aerial vehicle to a second delivery location.

15. An unmanned aerial vehicle for package delivery, comprising:
- a body;
- rotors powered by a motor on the body;
- a carrier on the body to hold a package;
- processor circuitry supported by the body and in electrical communication with a memory, the processor circuitry being configured to:
- guide the unmanned aerial vehicle to a first location for delivering the package;
- sense authentication data at the first location;
- determine, using a facial recognition program, whether the authentication data corresponds to the recipient, wherein the facial recognition program compares at least one metric associated with the at least one authentication image with at least one metric associated with at least one stored image corresponding to the recipient;
- instructing the carrier to release the package to the recipient in response to a determination, by the facial recognition instructions, that the authentication data corresponds to the recipient;
- determine delivery approval based on lack of authentication data and the first location does not include an authorized deposit location:
- upon lack of delivery approval, identify a secure location at the first location;
- instruct the unmanned aerial vehicle to wait a first period at the secure location; and
- in response to receiving, prior to an expiration of the first period, a time extension request from the recipient, instruct the unmanned aerial vehicle to wait a second period at the secure location.

16. The unmanned aerial vehicle of claim 15, wherein the processor circuitry is configured to deposit the package upon determining valid authentication data and facial recognition during either the first period or the second period.

17. The unmanned aerial vehicle of claim 16, wherein the authentication data further includes at least one of fingerprint data of the recipient, voice matching of the recipient, retina scan data of the recipient, or combinations thereof.

18. The unmanned aerial vehicle of claim 17, wherein the processor circuitry, upon expiration of the second time period, reroutes the unmanned aerial vehicle to a second delivery location.

19. The unmanned aerial vehicle of claim 18, wherein rerouting includes electronically receiving a request from a recipient device requesting delivery at the second delivery location.

20. The unmanned aerial vehicle of claim 19, wherein rerouting includes determining a state of charge of a battery of the unmanned aerial vehicle and calculating whether the unmanned aerial vehicle can the package to the second delivery location and return to an unmanned aerial vehicle home location.

* * * * *